US012600273B2

(12) United States Patent
Saucier et al.

(10) Patent No.: US 12,600,273 B2
(45) Date of Patent: Apr. 14, 2026

(54) INFANT TRANSPORT SYSTEM AND ASSEMBLY

(71) Applicant: Evenflo Company, Inc., Miamisburg, OH (US)

(72) Inventors: Shain A. Saucier, Charlotte, NC (US); Charles H. Keegan, Milton, MA (US); Zhang Meng, Suzhou (CN); Yang Xiaoyong, Suzhou (CN); Gao Xiang, Suzhou (CN); Lv Wenlong, Suzhou (CN); Feng Bo, Suzhou (CN)

(73) Assignee: Evenflo Company, Inc., Miamisburg, OH (US)

( * ) Notice: Subject to any disclaimer, the term of this patent is extended or adjusted under 35 U.S.C. 154(b) by 370 days.

(21) Appl. No.: 18/098,306

(22) Filed: Jan. 18, 2023

(65) Prior Publication Data

US 2024/0239249 A1 Jul. 18, 2024

(51) Int. Cl.
B62B 7/10 (2006.01)
B60N 2/28 (2006.01)
B62B 7/08 (2006.01)

(52) U.S. Cl.
CPC ......... B60N 2/2848 (2013.01); B60N 2/2845 (2013.01); B62B 7/08 (2013.01)

(58) Field of Classification Search
CPC .. B62B 7/08; B62B 7/12; B62B 7/145; B62B 7/06; B62B 7/04; B62B 7/00; B62B 7/10; B62B 7/14; B62B 7/142; B62B 7/105; B62B 7/062; B62B 9/20; B62B 9/10; B62B 9/102; B62B 9/12; B62B 9/203; B62B 5/065; B62B 5/08; B62B 5/087; B62B 5/06; B62B 5/067; B62B 2205/104; B62B 2205/10; B60N 2/2848; B60N 2/2845; B60N 2/2842; B60N 2/28; B60N 2/26; B60N 2/2821
See application file for complete search history.

(56) References Cited

U.S. PATENT DOCUMENTS 4,371,206 A 2/1983 Johnson, Jr.
4,634,175 A 1/1987 Wise
(Continued)

FOREIGN PATENT DOCUMENTS

CN 201124777 Y 10/2008
CN 202686025 U 1/2013
(Continued)

OTHER PUBLICATIONS

International Search Report and Written Opinion received for PCT Patent Application No. PCT/CN2023/115629, mailed on Oct. 24, 2023, 15 pages (11 pages of original copy and 4 pages of English Translation).

*Primary Examiner* — James M Dolak
(74) *Attorney, Agent, or Firm* — Shook, Hardy & Bacon L.L.P.

(57) ABSTRACT
A system to transport infant children is provided. The system includes a base configured to be secured to a portion of an automobile; a chassis releasably coupled to the base; an infant car seat releasably coupled to the base and the chassis; a first two-function release mechanism in the base and the chassis and operable via a first handle on the chassis and a second two-function release mechanism in the infant car seat and the chassis and operable via a second handle on the infant car seat.

13 Claims, 21 Drawing Sheets

(56)                References Cited

U.S. PATENT DOCUMENTS

| | | | | |
|---|---|---|---|---|
| 4,685,688 | A | 8/1987 | Edwards | |
| 4,733,909 | A | 3/1988 | Single et al. | |
| 4,736,959 | A | 4/1988 | Van Steenburg | |
| 4,762,331 | A * | 8/1988 | Tucker | B62B 7/12 280/30 |
| 4,832,354 | A * | 5/1989 | LaFreniere | B60N 2/2848 280/30 |
| 4,834,403 | A * | 5/1989 | Yanus | B62B 7/12 280/30 |
| 4,872,693 | A | 10/1989 | Kennel | |
| 4,874,182 | A * | 10/1989 | Clark | B62B 7/12 280/47.38 |
| 4,878,680 | A | 11/1989 | Molnar | |
| 4,896,894 | A | 1/1990 | Singletary | |
| 4,902,026 | A | 2/1990 | Maldonado | |
| 4,946,180 | A | 8/1990 | Baer | |
| 4,986,599 | A | 1/1991 | Wise | |
| 4,989,888 | A * | 2/1991 | Qureshi | B60N 2/286 280/30 |
| 5,104,134 | A | 4/1992 | Cone | |
| 5,133,567 | A * | 7/1992 | Owens | B62B 7/12 280/30 |
| 5,143,419 | A | 9/1992 | Tepper et al. | |
| 5,230,523 | A | 7/1993 | Wilhelm | |
| 5,318,311 | A | 6/1994 | Bofill | |
| 5,360,221 | A * | 11/1994 | Chai | B60N 2/2839 280/30 |
| 5,395,154 | A | 3/1995 | Wang | |
| 5,398,951 | A | 3/1995 | Ryu | |
| 5,403,022 | A | 4/1995 | Snider | |
| 5,431,478 | A * | 7/1995 | Noonan | B62B 7/12 297/130 |
| 5,527,090 | A | 6/1996 | Cone, II | |
| 5,673,924 | A * | 10/1997 | Demick | B62B 7/12 280/30 |
| 5,772,279 | A * | 6/1998 | Johnson, Jr. | B60N 2/2848 297/440.16 |
| 5,823,547 | A * | 10/1998 | Otobe | B60N 2/2839 280/30 |
| 5,890,762 | A | 4/1999 | Yoshida | |
| 5,893,606 | A | 4/1999 | Chiang | |
| 5,961,180 | A | 10/1999 | Greger et al. | |
| 6,070,890 | A | 6/2000 | Haut et al. | |
| 6,183,044 | B1 | 2/2001 | Koyanagi et al. | |
| 6,237,995 | B1 * | 5/2001 | Dierickx | B60N 2/286 297/130 |
| 6,253,392 | B1 | 7/2001 | Conforti et al. | |
| 6,296,259 | B1 | 10/2001 | Anderson | |
| 6,416,272 | B1 | 7/2002 | Suehiro et al. | |
| 6,511,105 | B1 | 1/2003 | Sakamoto | |
| 6,561,577 | B2 | 5/2003 | Kelly | |
| 6,655,702 | B2 | 12/2003 | Senger | |
| 6,695,400 | B2 | 2/2004 | Washizuka et al. | |
| 6,793,280 | B2 * | 9/2004 | Washizuka | B60N 2/2887 297/217.2 |
| 6,893,040 | B2 * | 5/2005 | Hou | B62B 7/145 297/183.2 |
| 6,910,696 | B2 | 6/2005 | Bargery et al. | |
| 6,979,057 | B2 * | 12/2005 | Sedlack | B60N 2/2851 297/250.1 |
| 6,983,986 | B2 | 1/2006 | Jane Santamaria | |
| 6,986,518 | B1 * | 1/2006 | Besaw | B60N 2/2821 280/47.38 |
| 7,040,694 | B2 * | 5/2006 | Sedlack | A47D 13/02 280/47.38 |
| 7,104,603 | B2 | 9/2006 | Keegan et al. | |
| 7,311,353 | B1 * | 12/2007 | Johnson | B60N 2/2848 280/30 |
| 7,485,086 | B2 | 2/2009 | Dickie | |
| 7,497,461 | B2 | 3/2009 | Emerson | |
| 7,506,921 | B1 | 3/2009 | Sigmon et al. | |
| 7,540,507 | B1 | 6/2009 | Kennedy | |
| 7,543,886 | B2 * | 6/2009 | Gutierrez-Hedges | B60N 2/2845 280/30 |
| 7,597,396 | B2 * | 10/2009 | Longenecker | B60N 2/2845 297/256.16 |
| 7,600,766 | B2 * | 10/2009 | Erskine | B60N 2/2845 280/47.25 |
| 7,669,927 | B1 | 3/2010 | Zaid | |
| 7,775,532 | B2 * | 8/2010 | Chen | B62B 7/145 280/47.38 |
| 7,988,230 | B2 | 8/2011 | Heisey et al. | |
| 8,172,253 | B2 * | 5/2012 | Song | B62B 7/145 280/642 |
| 8,393,678 | B2 * | 3/2013 | Keegan | B60N 2/28 297/256.16 |
| 8,434,781 | B2 * | 5/2013 | Mazar | B60N 2/2848 280/30 |
| 8,469,389 | B2 | 6/2013 | Mazar et al. | |
| 8,469,390 | B2 | 6/2013 | Mazar et al. | |
| 8,523,218 | B2 | 9/2013 | Doucette et al. | |
| 8,651,502 | B2 | 2/2014 | Winterhalter et al. | |
| 8,801,028 | B2 | 8/2014 | Mazar et al. | |
| 8,876,208 | B2 * | 11/2014 | Heisey | B60N 2/2827 297/130 |
| 8,936,254 | B2 * | 1/2015 | Viana | B60N 2/2848 280/30 |
| 8,998,242 | B2 * | 4/2015 | Wang | B60N 2/2848 280/30 |
| 9,027,952 | B2 * | 5/2015 | Zhu | B62B 7/145 280/30 |
| 9,119,483 | B1 * | 9/2015 | Heisey | B60N 2/2821 |
| 9,168,940 | B1 | 10/2015 | Leszczak et al. | |
| 9,227,536 | B1 | 1/2016 | Cary et al. | |
| 9,227,648 | B2 * | 1/2016 | Sundberg | B62B 7/006 |
| 9,242,585 | B2 * | 1/2016 | Kozinski | B60N 2/2848 |
| 9,260,039 | B1 * | 2/2016 | Satterfield | B62B 7/145 |
| 9,308,839 | B1 * | 4/2016 | Gleckler | B60N 2/2821 |
| 9,326,900 | B2 | 5/2016 | Bancroft | |
| 9,339,118 | B2 | 5/2016 | Gubitosi et al. | |
| 9,371,017 | B2 | 6/2016 | Spence et al. | |
| 9,469,222 | B2 | 10/2016 | Williams | |
| 9,499,074 | B2 | 11/2016 | Strong et al. | |
| 9,505,321 | B2 * | 11/2016 | Mazar | B60N 2/2845 |
| 9,603,464 | B2 | 3/2017 | Sclare et al. | |
| 9,738,181 | B1 | 8/2017 | Termini | |
| 9,764,755 | B2 | 9/2017 | D'Anastasi | |
| 9,868,456 | B2 | 1/2018 | Stiba et al. | |
| 10,035,437 | B1 * | 7/2018 | Ballard | B60N 2/2842 |
| 10,052,981 | B2 * | 8/2018 | Wright | B60N 2/2845 |
| 10,058,192 | B2 | 8/2018 | Williams et al. | |
| 10,427,558 | B1 | 10/2019 | Dickens | |
| 10,710,478 | B2 | 7/2020 | Reaves et al. | |
| 10,933,778 | B1 * | 3/2021 | Hinson | B60N 2/2821 |
| 11,472,316 | B2 * | 10/2022 | Olfers | B60N 2/2887 |
| 11,584,267 | B2 | 2/2023 | Longenecker et al. | |
| 11,723,477 | B2 | 8/2023 | Rogers et al. | |
| 11,932,300 | B1 * | 3/2024 | Jablonski | B62B 7/066 |
| 11,958,524 | B1 * | 4/2024 | Saucier | B60N 2/2848 |
| 12,397,689 | B2 * | 8/2025 | Saucier | B60N 2/2848 |
| 12,459,555 | B2 * | 11/2025 | Saucier | B62B 7/145 |
| 2002/0060444 | A1 | 5/2002 | Cote | |
| 2003/0015894 | A1 | 1/2003 | Bargery et al. | |
| 2004/0173997 | A1 | 9/2004 | Voll | |
| 2005/0264062 | A1 * | 12/2005 | Longenecker | B60N 2/2821 297/250.1 |
| 2010/0019547 | A1 * | 1/2010 | Gray | B60N 2/2845 280/30 |
| 2010/0225150 | A1 | 9/2010 | Duncan et al. | |
| 2011/0163518 | A1 | 7/2011 | Song | |
| 2012/0032418 | A1 | 2/2012 | Doucette et al. | |
| 2012/0032420 | A1 | 2/2012 | Mazar et al. | |
| 2012/0119457 | A1 * | 5/2012 | Williams | B62B 7/083 280/30 |
| 2013/0229033 | A1 | 9/2013 | Lee | |
| 2014/0265255 | A1 | 9/2014 | Wang | |
| 2017/0240072 | A1 | 8/2017 | Wright | |
| 2018/0009341 | A1 | 1/2018 | Carlile | |
| 2018/0029625 | A1 | 2/2018 | Ruggiero et al. | |

(56) References Cited

U.S. PATENT DOCUMENTS

| | | | |
|---|---|---|---|
| 2020/0269733 | A1 | 8/2020 | Heisey et al. |
| 2021/0009012 | A1 | 1/2021 | Olfers et al. |
| 2022/0346569 | A1 | 11/2022 | Liu |
| 2022/0355713 | A1 | 11/2022 | Longenecker et al. |
| 2023/0014310 | A1 | 1/2023 | Longenecker et al. |
| 2023/0382446 | A1 | 11/2023 | Crossgrove et al. |
| 2024/0239248 | A1 | 7/2024 | Saucier et al. |
| 2024/0239250 | A1 | 7/2024 | Saucier et al. |
| 2024/0239396 | A1 | 7/2024 | Saucier et al. |
| 2024/0239398 | A1 | 7/2024 | Saucier et al. |
| 2024/0246462 | A1 | 7/2024 | Saucier et al. |
| 2024/0246593 | A1 | 7/2024 | Saucier et al. |
| 2024/0246594 | A1 | 7/2024 | Saucier et al. |
| 2024/0246595 | A1 | 7/2024 | Saucier et al. |
| 2024/0246596 | A1 | 7/2024 | Saucier et al. |
| 2024/0246597 | A1 | 7/2024 | Saucier et al. |

FOREIGN PATENT DOCUMENTS

| | | | |
|---|---|---|---|
| CN | 204687877 | U | 10/2015 |
| CN | 207257442 | U | 4/2018 |
| CN | 216861236 | U | 7/2022 |
| CN | 115402164 | A | 11/2022 |
| CN | 115402165 | A | 11/2022 |
| CN | 218558646 | U | 3/2023 |
| CN | 218750429 | U | 3/2023 |
| EP | 1918155 | A2 | 5/2008 |
| WO | 2024/046335 | A1 | 3/2024 |

* cited by examiner

INFANT TRANSPORT SYSTEM AND ASSEMBLY

TECHNICAL FIELD

The present disclosure generally includes a modular, convertible infant transport system and an assembly.

BACKGROUND

Traditionally, infants may be transported in cars and strollers. There have been some attempts to develop systems that may be used as both a car seat and a stroller, but these systems, to date, suffer from a number of disadvantages and drawbacks, such as not offering a desired level of optional configurations.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

Figure 1:
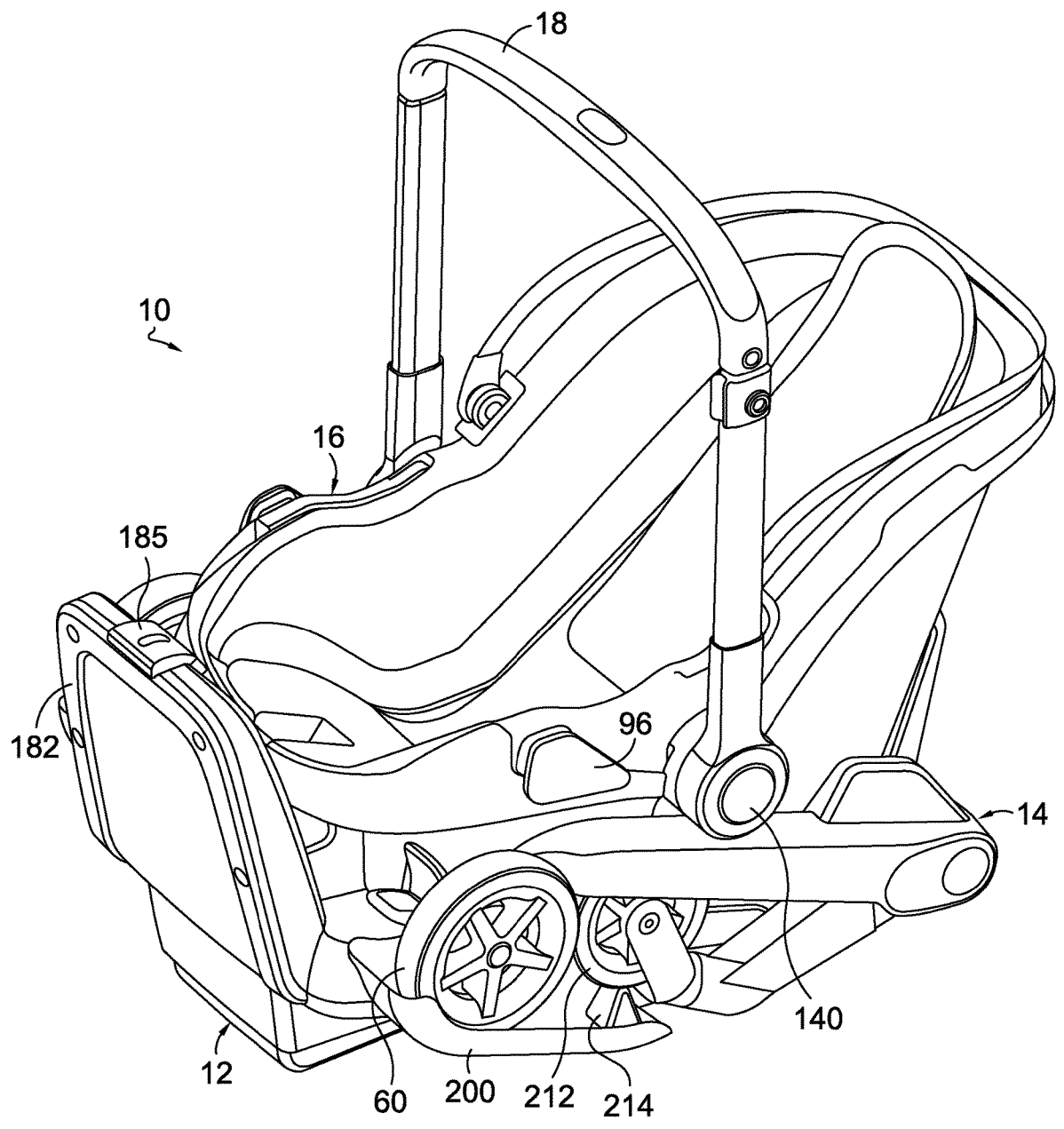
FIG. 1 is a perspective view of an infant transport system in a first transport condition.

In some aspects, a system to transport infant children is provided. The system includes a base configured to be secured to a portion of an automobile; a chassis releasably coupled to the base; an infant car seat releasably coupled to the base and the chassis; a first two-function release mechanism in the base and the chassis and operable via a first handle on the chassis and a second two-function release mechanism in the infant car seat and the chassis and operable via a second handle on the infant car seat. In some aspects, the first function of the first release mechanism releases the chassis and the infant car seat from the base as a combined unit, upon operation of the first handle on the chassis. In further aspects, the first function of the second release mechanism releases the infant car seat from the combined unit of the chassis and the base, upon operation of the second handle on the infant car seat.

In a further example, an infant transport assembly is provided. The infant transport assembly includes a base, a chassis releasably coupled to the base, and an infant car seat releasable coupled to the base and the chassis. The infant transport assembly further includes a first means for releasing the chassis and the infant car seat from the base as a combined unit, and a second means for releasing the infant car seat from the combined unit of the base and the chassis.

In a further implementation, a multi-function infant transport system includes a base, configured to be secured to a portion of an automobile, a chassis releasably coupled to the base, and a shell releasably coupled to the base and the chassis. The multi-function infant transport assembly further includes a first multi-function release mechanism distributed in the base and chassis, and operable via a first handle on the chassis to change functions of the infant transport system, and a second multi-function release mechanism distributed in the shell and the chassis, and operable via a second handle on the shell to change functions of the infant transport system.

The above features and advantages and other features and advantages of the present teachings are readily apparent from the following detailed description of the modes for carrying out the present teachings when taken in connection with the accompanying drawings.

In some aspects, at a high-level, an infant transport system is provided that offers increased flexibility in the usable configurations of the system. The infant transport system, in some aspects, includes a base and an independent chassis that is releasably coupled to the base via a first release mechanism. The infant transport system also includes an infant car seat, (throughout this specification, the infant car seat may also be referred to as a shell), that is releasably coupled to the chassis via a second release mechanism. In a first transport condition, the chassis is intermediate the base and the infant car seat. In this first transport condition, the assembly of the base, the chassis and the infant car seat are usable within a vehicle to transport an infant. The chassis and the infant car seat are releasable from the base, as a combined unit, upon operation of the first release mechanism. In this condition, the front legs and rear legs of the chassis are deployable away from the frame of the chassis, such that the assembly is usable as an infant stroller. Additionally, in some aspects, the infant car seat is releasable from the combined unit of the base and the chassis upon operation of the second release mechanism. In this condition, the infant car seat is usable as an infant carrier. Other features and details of operation of the infant transport system are described below in connection with the drawing figures.

Figure 2:
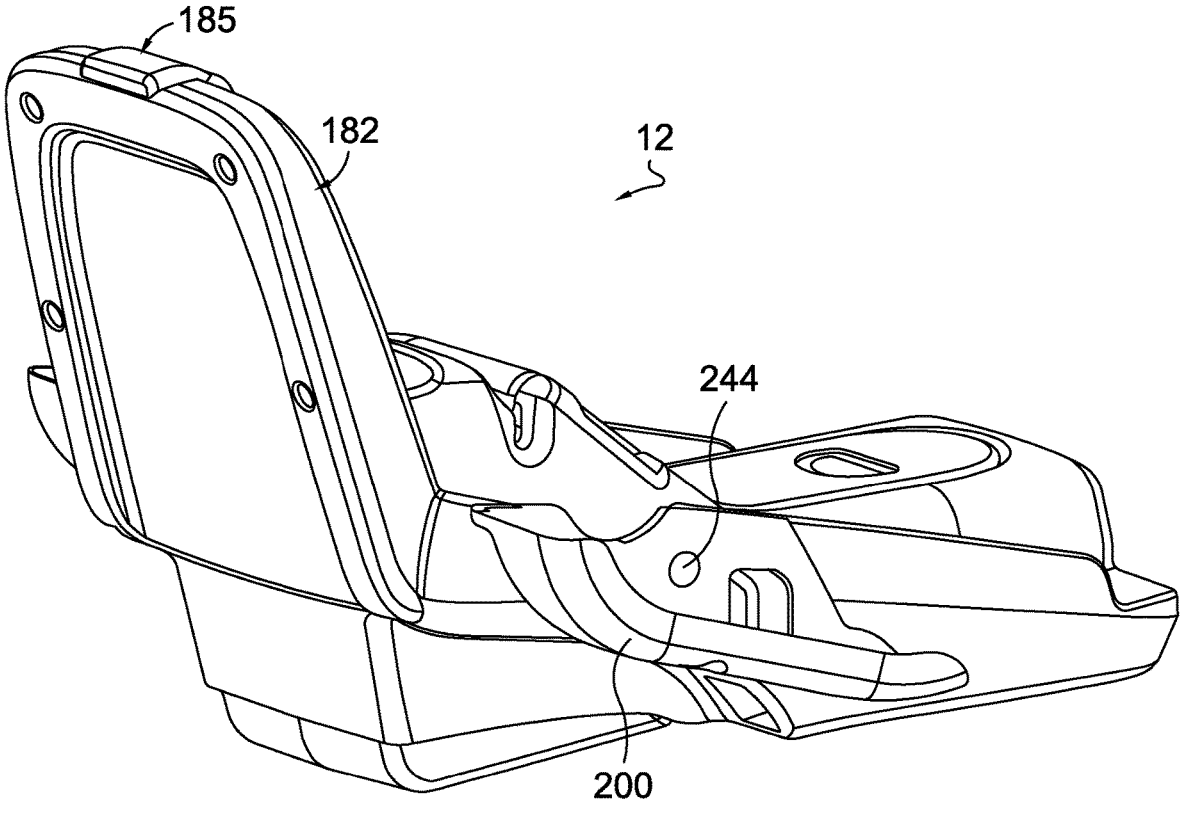
FIG. 2 is a perspective view of the base of the infant transport system decoupled from the chassis and the shell.
Figure 5:
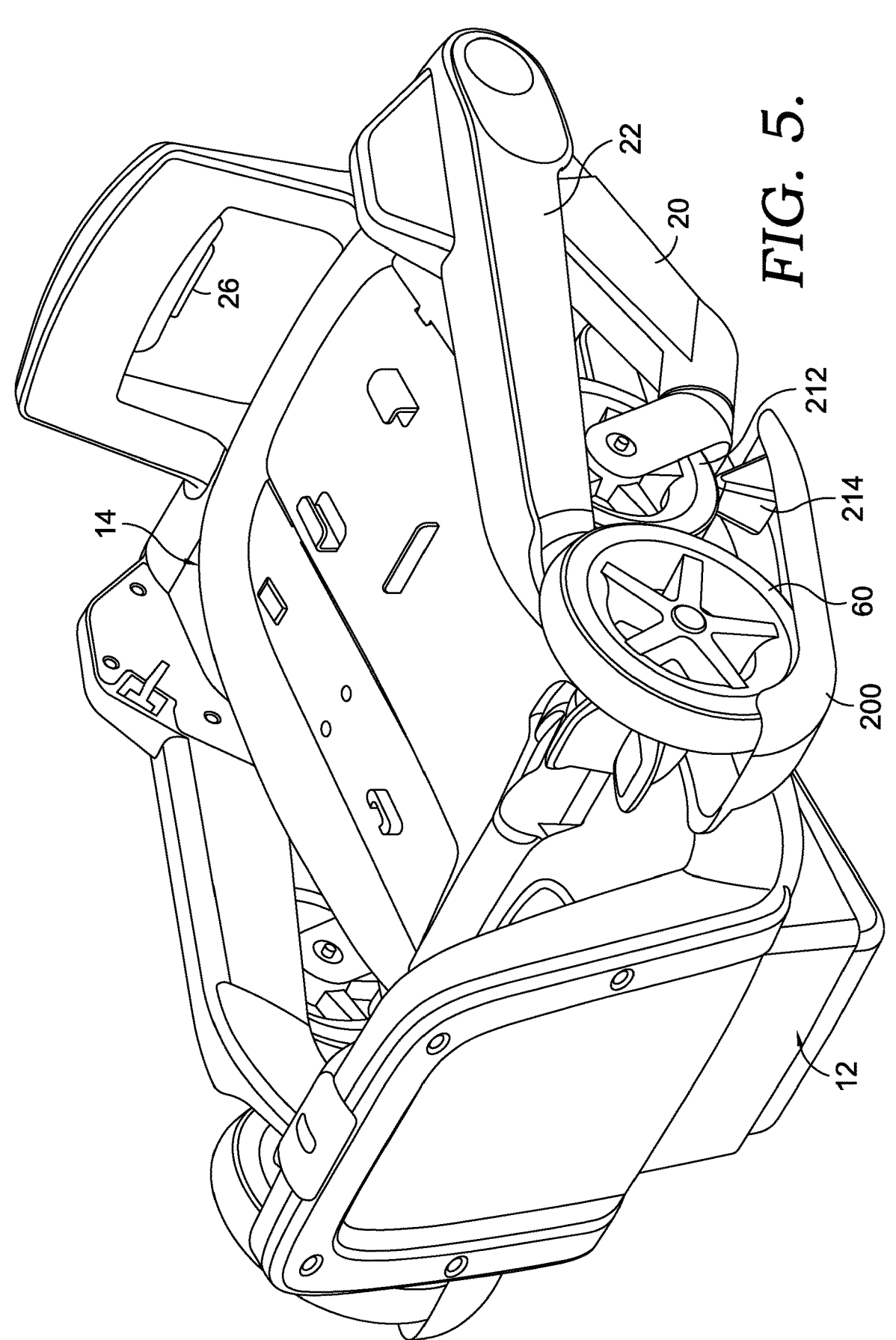
FIG. 5 is a perspective view of the chassis and the base of the infant transport system with the shell decoupled from the chassis and the base.
Figure 6:
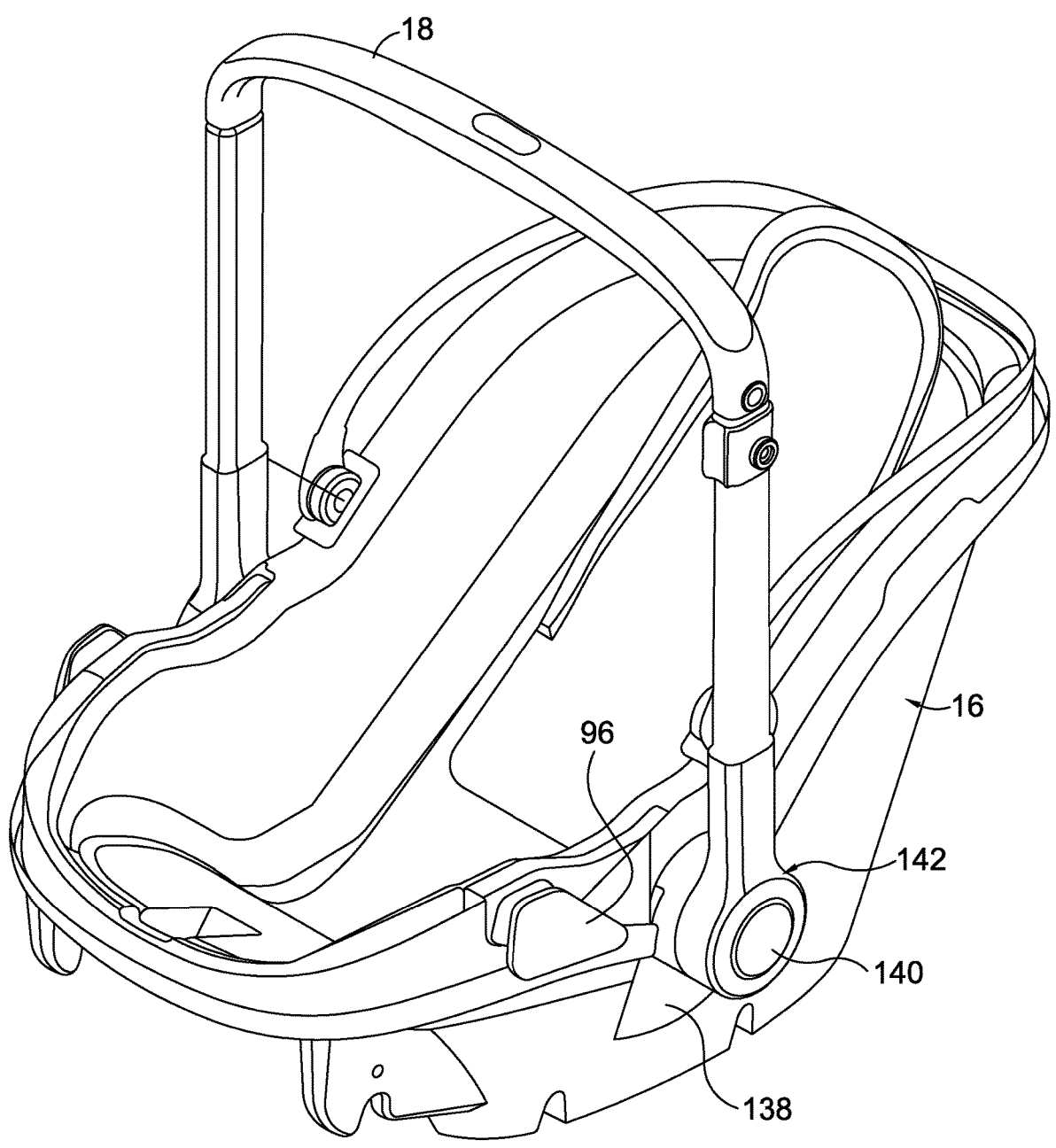
FIG. 6 is a perspective view of the shell of the infant transport system decoupled from the chassis and the base.
Figure 7:
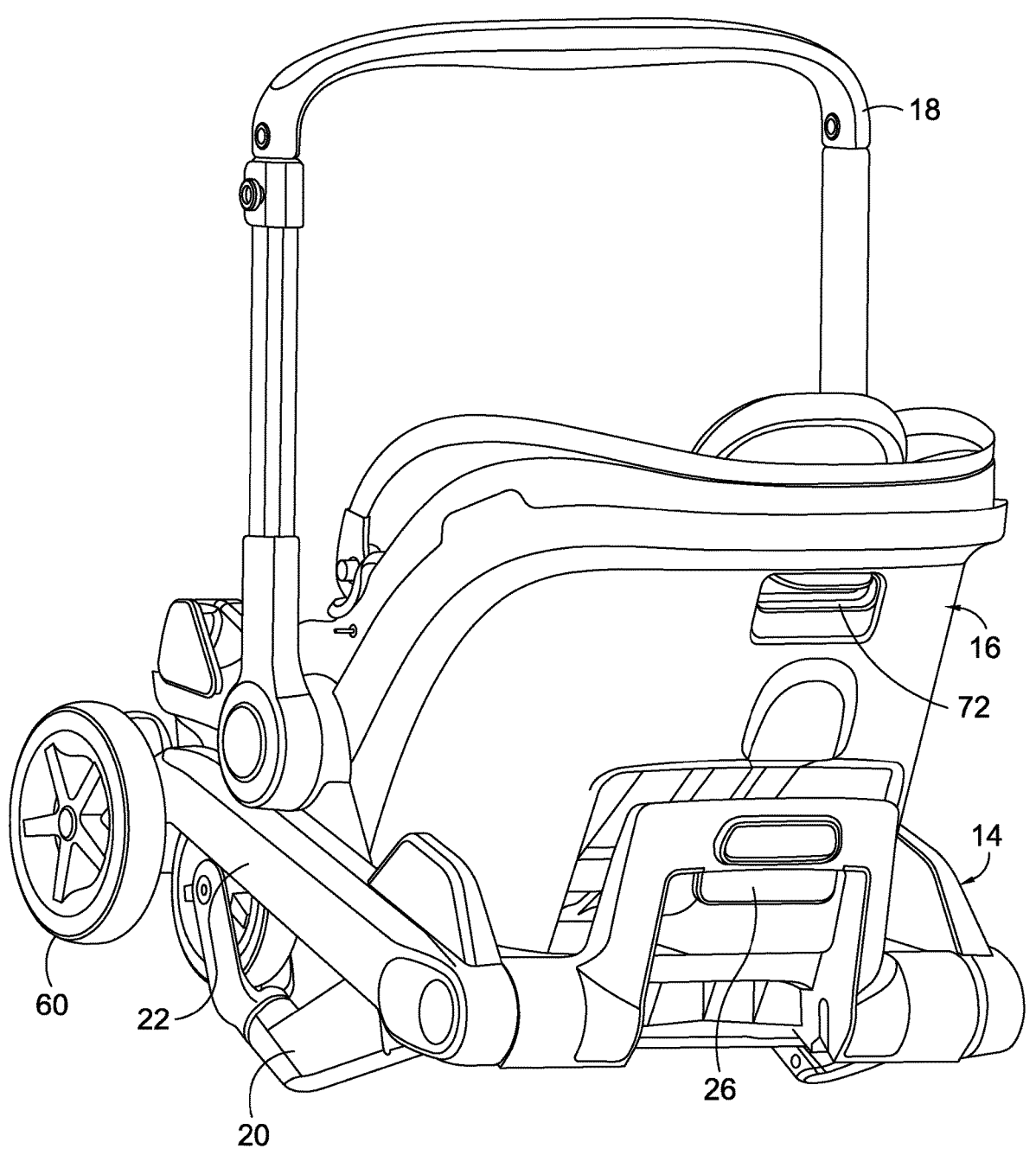
FIG. 7 is a view similar to FIGS. 3A and 3B from a different viewpoint.

Referring to the drawings, wherein like reference numbers refer to like components, FIGS. 1-21 depict an infant transport system, or assembly, 10. The infant transport system 10, in some aspects, includes a base 12, an independent chassis 14 releasably coupled to the base 12, and an infant car seat, or shell, 16. The base 12, the chassis 14 and the shell 16 are shown coupled together in FIG. 1 in a first transport condition, and is one example of the system 10 usable to secure an infant in a vehicle. While not shown to make other components more visible, the shell 16 is equipped with padding and an infant safety harness system. As shown in FIG. 2, the chassis 14 and the shell 16 are releasable from the base 12. The base 12 may be installed in a vehicle and secured in place using anchoring straps or the seat belt of the vehicle. Once the base 12 is installed in the vehicle, the combined unit of the chassis 14 and the shell 16 may be releasably coupled to the base 12, as further described below. FIG. 3 depicts the chassis 14 coupled to the shell 16 and removed from the base 12. In this transport condition, the assembly of the shell 16 and the chassis 14 is usable as an infant carrier (using a carrier handle 18), and may also be installed in a vehicle and used as a car seat as described in further detail below. As shown in FIG. 4, the chassis 14 includes a pair of front legs 20 that are each pivotally coupled to a respective one of a pair of rear legs 22 which are, in turn, pivotally coupled to the chassis 14. The front legs 20 and rear legs 22 are deployable from the transport condition shown in FIG. 3 to the transport condition shown in FIG. 4, such that the assembly of the chassis 14 and shell 16 are usable as a stroller. In this transport condition, the handle 18 is rotatable and extendable for use in pushing the stroller. As depicted in FIGS. 5 and 6, the shell 16 is also releasable from the combined unit of the base 12 and the chassis 14. In the transport condition shown in FIG. 6, the shell 16 is usable as an infant carrier and can also be secured within a vehicle and usable as a car seat. The infant transport system 10 thus allows for greater flexibility in the various transport conditions as is further described in detail below.

Figure 8:
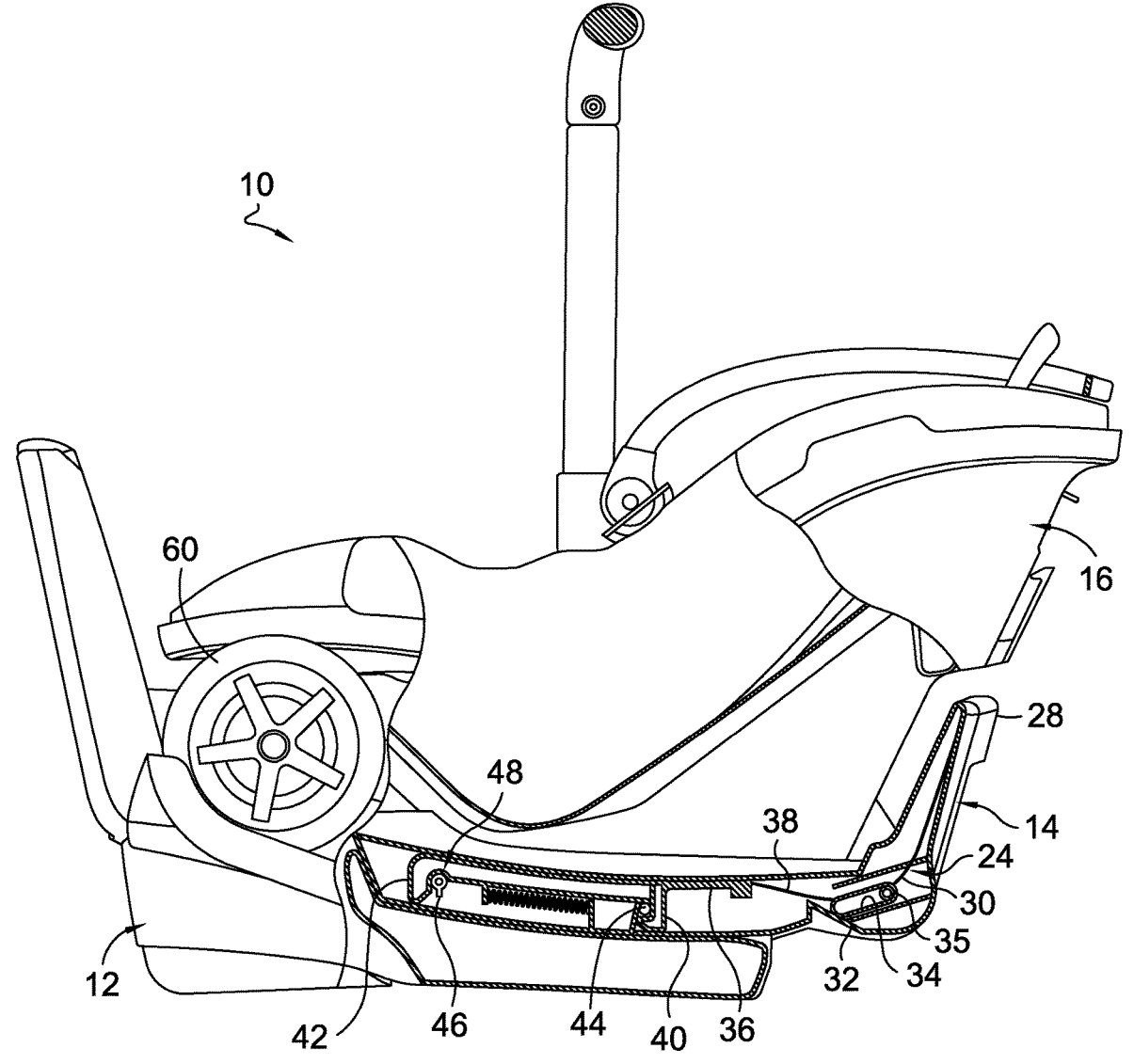
FIG. 8 is a side view of the infant transport system in partial cross-section.
Figure 9:
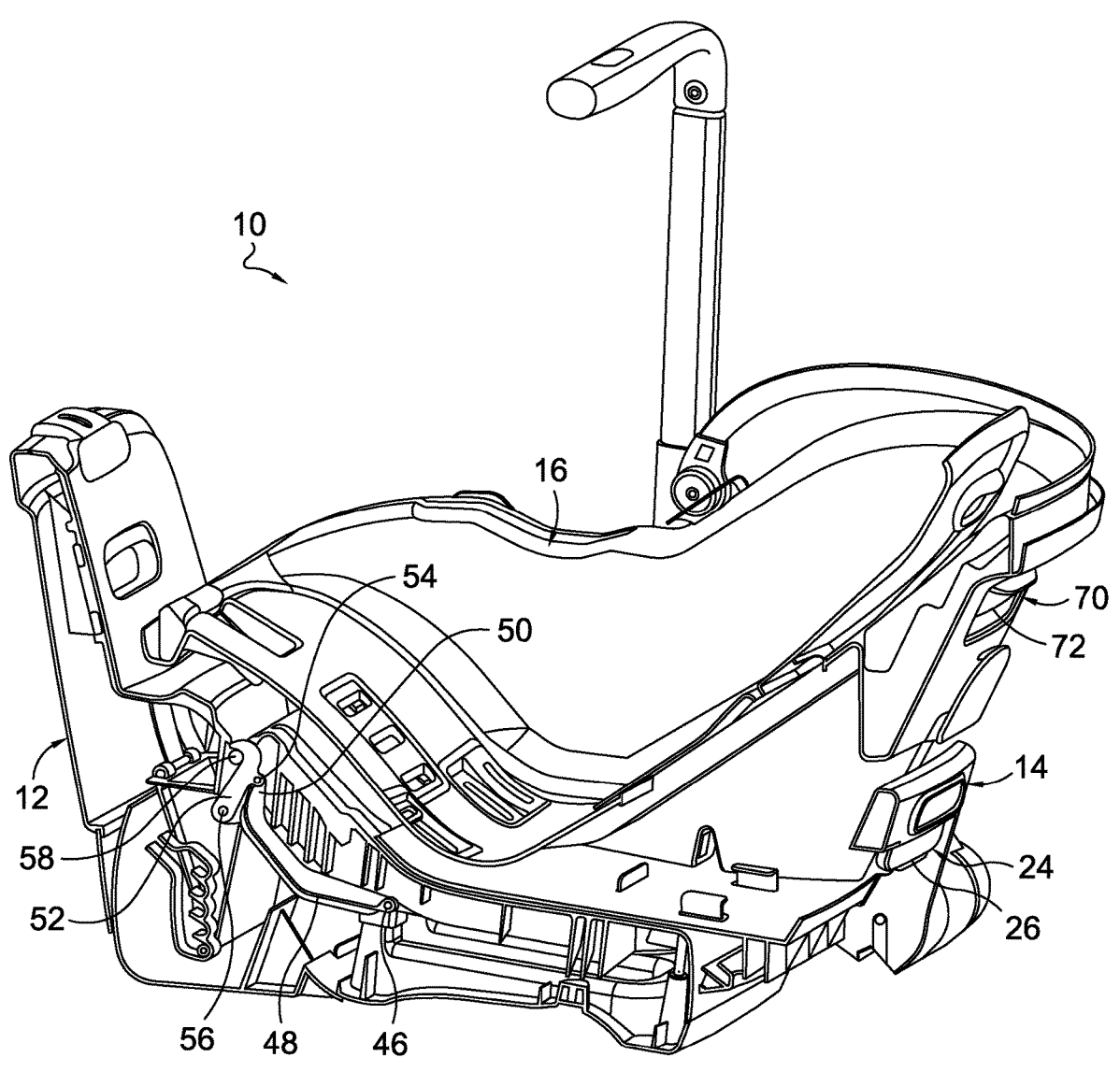
FIG. 9 is a perspective cross-section view of the infant transport system of FIG. 1.

As shown in FIGS. 8-9, a first release mechanism 24 is distributed between the chassis 14 and the base 12. The first release mechanism 24 includes a release handle 26 movably disposed on a frame 28 of the chassis 14. In some aspects, the release handle 26 is movably coupled to the frame 28, allowing the release handle 26 to move generally upwardly and downwardly. The release handle 26 is coupled to a cable 30 that extends downwardly from the handle 26 within the interior of the frame 28. The end of cable 30 opposite the handle 26 is coupled to a carriage 32 having a slot 34 formed therein. The carriage 32 is slidable along a stationary rod 35 fixed to the chassis 14 and that extends through the slot 34. The carriage 32 moves rearwardly along the rod 35 when the handle 26 is pulled upwardly. As best seen in FIG. 8, the carriage 32 is coupled to a lever 36 that moves as the carriage 32 moves. In some aspects, the carriage 32 is coupled to the lever 36 via a separate cable 38. In other aspects, the cable 38 is integrally formed as a part of lever 36 or as a part of carriage 32. The cable 30 and the cable 38

(along with other cables discussed herein) may be made from a flexible material, and in some aspects, are made from a steel wire or a plastic material. The lever 36 includes a downwardly extending hook 40 and a downwardly extending finger 42. The hook 40 releasably engages a post 44 that is fixed to the base 12. In some aspects, the post 44 is a U-bolt that is fastened to the base 12. As the handle 26 is pulled upwardly, the hook 40 is moved rearwardly to release the hook 40 from the post 44. The finger 42 engages one end 46 of an arm 48 that is slidably held within the base 12. The end 46 of arm 48 has a portion that extends outwardly and is exposed on the exterior of the base 12 (see FIG. 20). As best seen in FIG. 9, the end 46 has another portion that is within the interior of the base 12. The arm 48 extends from the end 46 upwardly to a distal end 50 that is pivotally coupled to a hook 52 at pivot point 54. The hook 52 is also pivotally coupled to the base 12 at pivot point 56. The hook 52 releasably engages a rod 58 on the chassis 14. In some aspects, the rod 58 on the chassis 14 serves as an axle for wheels 60 on the end of rear legs 22. In other aspects, the rod 58 is discontinuous and does not function as an axle.

The first release mechanism 24 is operable, in a first function, to release the chassis 14 and the shell 16, as a combined unit, from the base 12. As the handle 26 is pulled upwardly, the cable 30 acts to move the carriage 32 and the lever 36 rearwardly, releasing the hook 40 from the post 44 on the base 12. As the lever 36 moves rearwardly, the finger 42 engages the first end 46 of the arm 48, moving the arm 48 rearwardly. This in turn rotates the hook 52 about pivot point 56, releasing the hook 52 from the rod 58. As these two attachment points (hook 40/post 44 and hook 52/rod 58) release, the chassis 14 and the shell 16 are releasable as a combined unit from the base 12. While only one side of the first release mechanism 24 is shown and described above, it should be understood that the handle 26 may be coupled to a similar series of components (cable 30, carriage 32, lever 36, cable 38, arm 48 and hook 52) on each side of the chassis 14.

Figure 10:
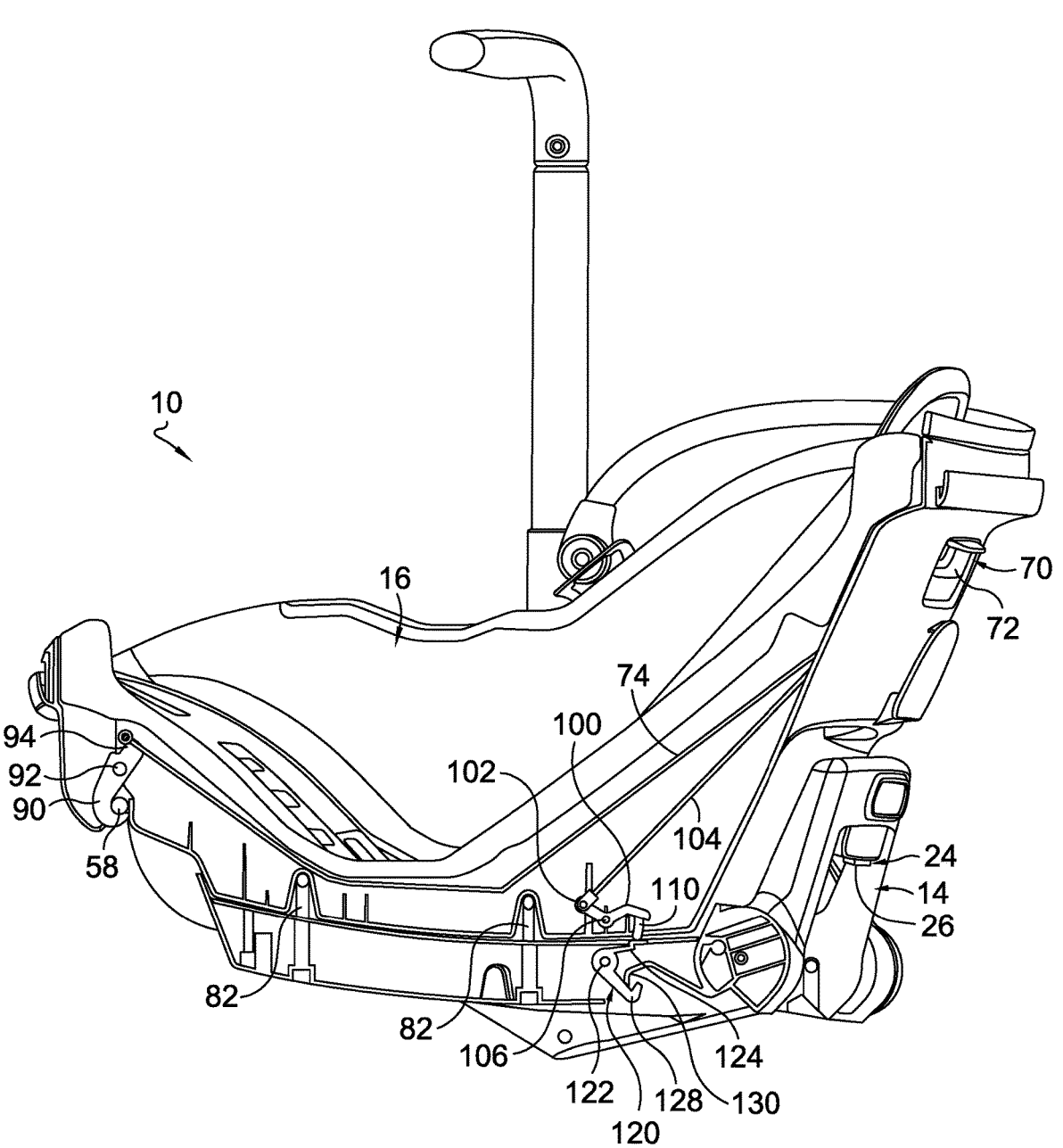
FIG. 10 is a cross-section view of the chassis and the shell of the infant transport system decoupled from the base.
Figure 11:
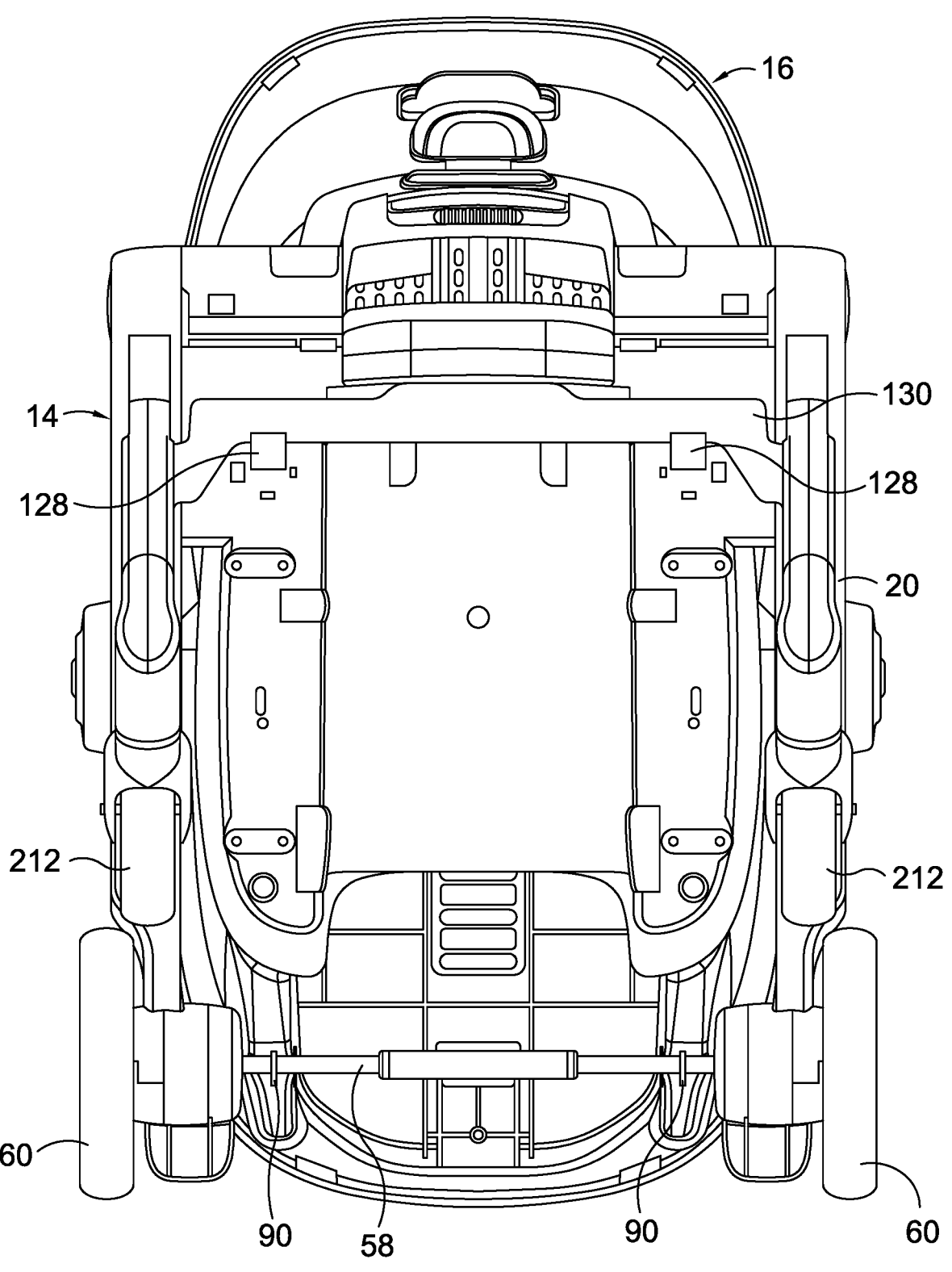
FIG. 11 is a bottom plan view of the chassis and the shell of the infant transport system decoupled from the base.
Figure 12:
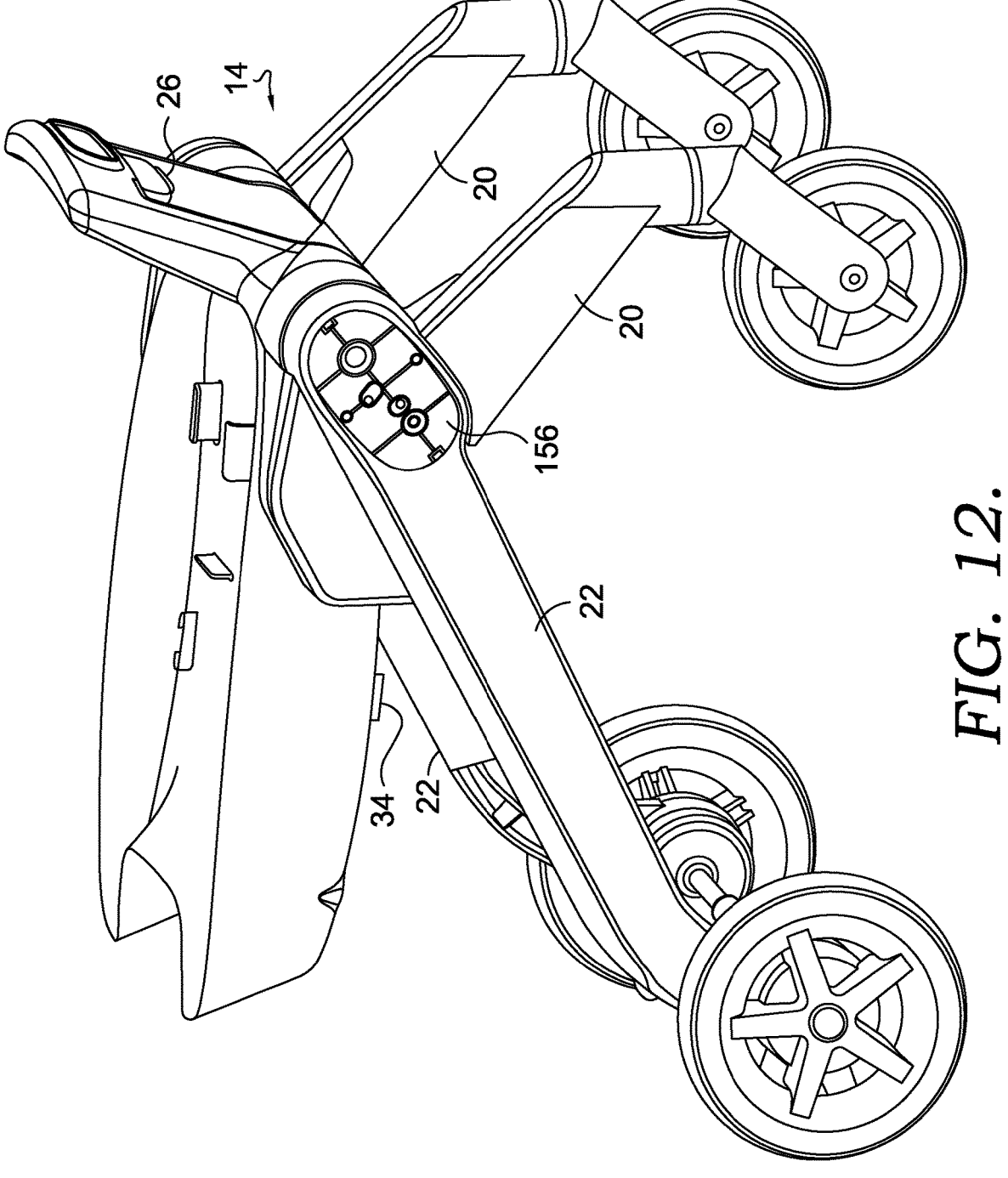
FIG. 12 is a perspective view of the chassis of the infant transport condition, shown with the legs deployed and with some parts broken away.
Figure 17:
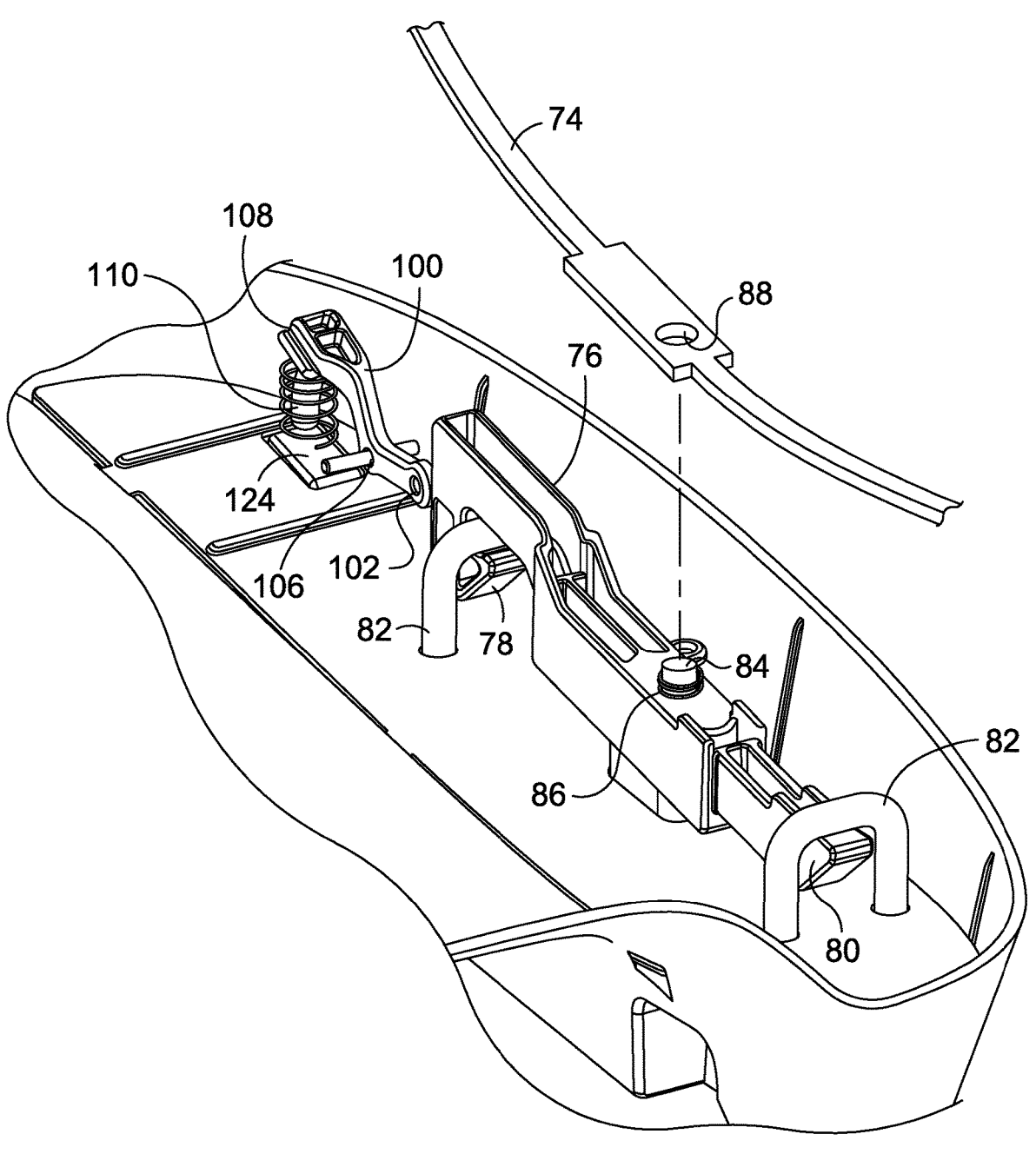
FIG. 17 is a partial exploded view of the interior of the shell of the infant transport system.
Figure 21:
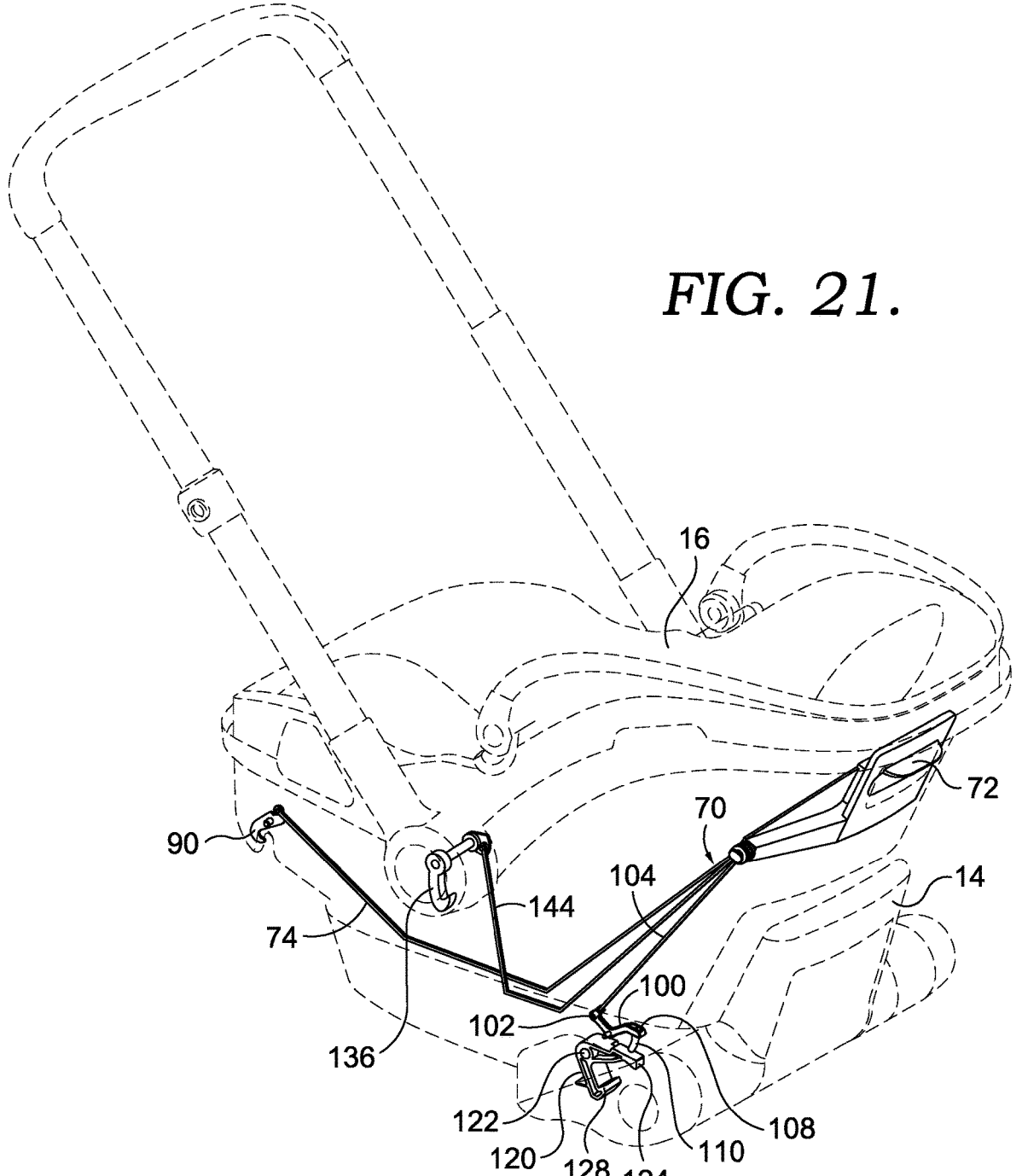
FIG. 21 is a view with certain components shown in an environment and showing the cabling of the second release mechanism.

A second release mechanism 70 is operable, in a first function, to release the shell 16 from the combined unit of the base 12 and the chassis 14. As best seen in FIG. 10, the second release mechanism 70 includes a release handle 72 movably disposed within the shell 16. As best seen in FIGS. 17 and 21, the handle 72 is selectively coupled, via a cable 74, to a release lever 76 positioned within the shell 16. The lever 76 includes a downwardly extending hook 78 and a front finger 80. As best seen in FIG. 17, both the hook 78 and the finger 80 releasably engage a pair of upwardly extending U-bolts 82 that are coupled to the chassis 14. The lever 76 is only operational when the chassis 14 is coupled to the base 12 (so that the shell 16 is removable from the combined unit of the chassis 14 and the base 12, but the shell 16 is not removable from the chassis 14 when the chassis 14 is decoupled from the base 12). To achieve this selective operation of the lever 76, the chassis 14 includes a spring-loaded pin 84. The pin 84 is moved upwardly and into the chassis 14 by the base 12 when the chassis 14 is coupled to the base 12. Conversely, when the chassis 14 is decoupled from the base 12, the pin 84 moves downwardly, biased by a spring. When the pin 84 moves upwardly (with the chassis 14 on the base 12), the pin 84 moves through a hole 86 in the lever 76 and into a corresponding hole 88 in the cable 74. With the pin 84 coupling the lever 76 and the cable 74, an upward force on the handle 72 is translated into a rearward movement of the lever 76, releasing the hook 78 and the finger 80 from engagement with the U-bolts 82. This action releases the central section of the shell 16 from the chassis 14. While not shown, the shell 16 may include a cover over the section of cable 74 having the hole 86 to ensure the pin 84 extends into the cable 74 (the cover acts to maintain cable 74 in close proximity to the lever 76.

In some aspects, as best seen in FIG. 21, the cable 74 extends forwardly to engage another hook 90 that is pivotally coupled inside shell 16 at pivot point 92. The hook 90 selectively engages a portion of the rod 58, as best seen in FIG. 10. The opposite end of the hook 90 has a tab 94 that is coupled to a terminal end of the cable 74. With this connection, an upward force on the handle 72 is translated to a rotational movement of the hook 90, releasing the hook 90 from the rod 58. This action releases the forward end of the shell 16 from the chassis 14. Therefore, when the shell 16 and chassis 14 are coupled to the base 12, the second release mechanism 70 is operable, in a first function through handle 72, to release the shell 16 from the combined unit of the chassis 14 and the base 12, allowing the shell 16 to be used as an infant carrier, without the chassis 14 and the base 12 (as shown in FIG. 6). The shell 16 is also usable as an infant car seat and can be secured in place within a vehicle with the provided vehicle seat belts. In some aspects, the shell 16 is provided with seat belt anchors 96 to facilitate such a connection.

In some aspects, the second release mechanism 70 is operable in a second function to deploy the front legs 20 and the rear legs 22 below the chassis 14 to allow use of the combined unit of the chassis 14 and the shell 16 as a stroller (transitioning from the transport condition shown in FIG. 3 to the transport condition shown in FIG. 4). To achieve this second function, as best seen in FIGS. 10, 17 and 21, the second release mechanism 70 also includes a pivot arm 100 having a first end 102 that is coupled to the release handle 72 via a cable 104. In some aspects, the cable 104 may be integrally formed with the cable 74, and in other aspects, the cable 104 is a separate component from cable 74. The pivot arm 100 is pivotally coupled within the shell 16 at pivot point 106. A second end 108 of the arm 100 includes a downwardly extending plunger 110 that is positioned to selectively extend from the interior of the shell 16. As the handle 72 is moved upwardly, the cable 104 moves the first end 102 upwardly (rotating about pivot point 106), causing the plunger 110 to move downwardly and outside of the shell 16. As best seen in FIG. 21, when the shell 16 is coupled to the chassis 14, the plunger 110 is positioned to interact with a release hook 120 that is pivotally coupled within the chassis 14 at pivot point 122. The release hook 120 includes a tab 124 that interacts with the plunger 110 and a hook end 128 opposite the tab 124. The hook end 128 releasably engages a front leg cross-brace 130 (see FIG. 11). When the release handle 72 is pulled upwardly when the chassis 14 and shell 16 are in the transport condition shown in FIG. 3A, the cable 74 and the cable 104 rotate the hook 90 and the hook 120 respectively. When the hook 90 rotates, the hook 90 disengages the rod 58 coupled to the rear legs 22. Similarly, when the hook 120 rotates, the hook 120 disengages the front leg cross brace 130. With the front legs 20 and the rear legs 22 disengaged, the combined unit of the chassis 14 and the shell 16 is allowed to move to the stroller transport condition shown in FIG. 4. In some aspects, the front legs 20 and the rear legs 22 may be spring-biased to the stroller transport condition, such that when the release handle 72 is pulled, the front legs 20 and the rear legs 22 are moved via gravity and the spring-assist to the deployed, stroller condition of FIG. 4.

Figure 18:
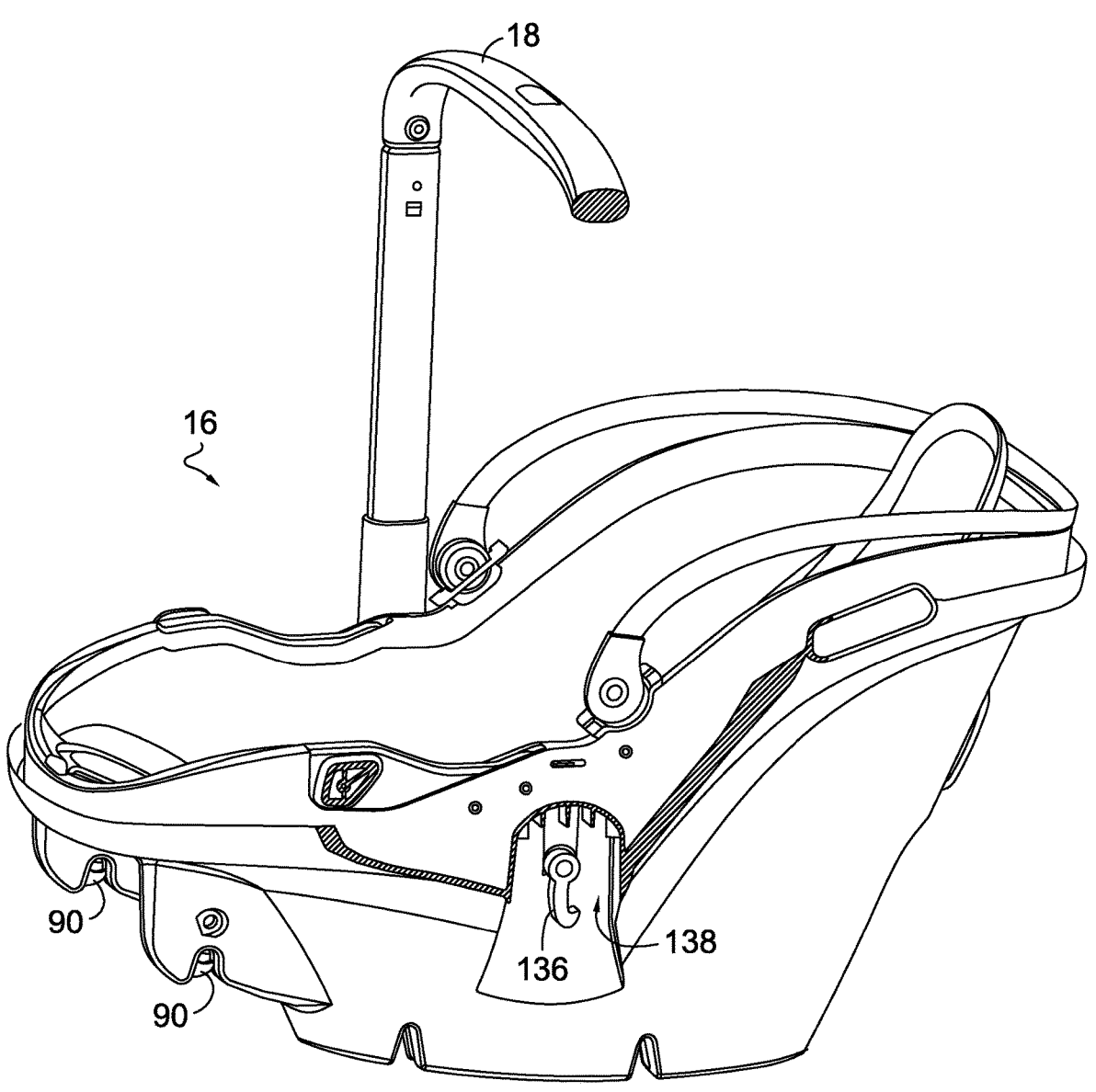
FIG. 18 is a partial cross-section of the shell of the infant transport system.
Figure 19:
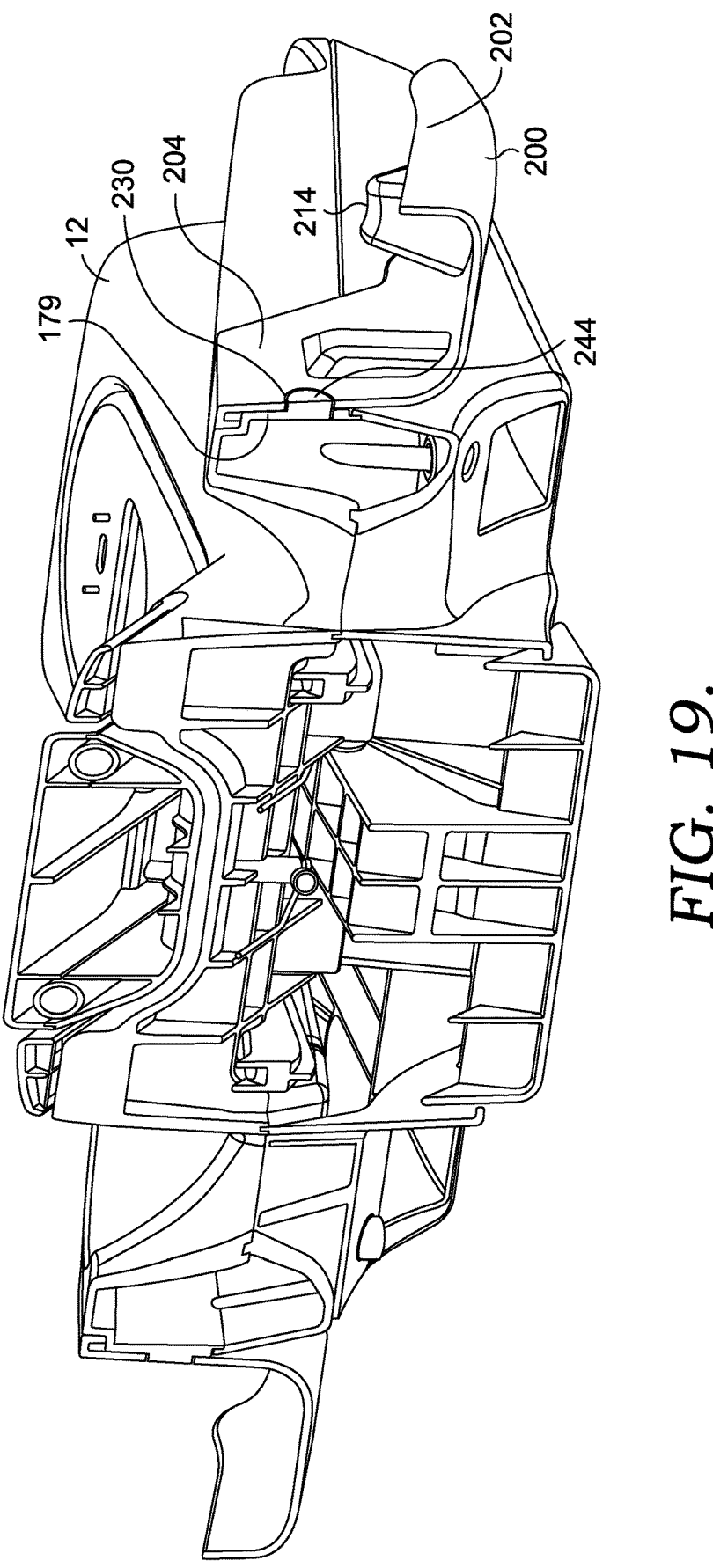
FIG. 19 is a cross-section of the chassis and the base of the infant transport system.

In some aspects, the second release mechanism 70 is operable in a third function to allow the shell 16, when separated from the chassis 14 and the base 12, to be releasably coupled to a standard tower stroller system, such as those already known in the art. To facilitate this connection, as best seen in FIG. 18, the shell 16 includes a release latch 136 pivotally coupled to the shell 16 within a recessed area 138. The recessed area 138 is located proximate a hub 140 of a handle assembly 142 on the shell 16. The latch 136 is pivotally biased to a closed orientation, allowing the shell 16 to drop into a standard tower stroller system, with the latch 136 engaging a portion of the standard tower stroller system (such as a cylindrical attachment portion). As seen in FIG. 21, the latch 136 is coupled, via a cable 144 to the release handle 72. As the release handle 72 is pulled, the latch 136 rotates to release the latch from engagement with the standard tower stroller system. In some aspects, the cable 144 may be integrally formed with cable 74 and/or cable 104, while in other aspects, the cable 144 is a separate component.

Figures 3A, 3B:
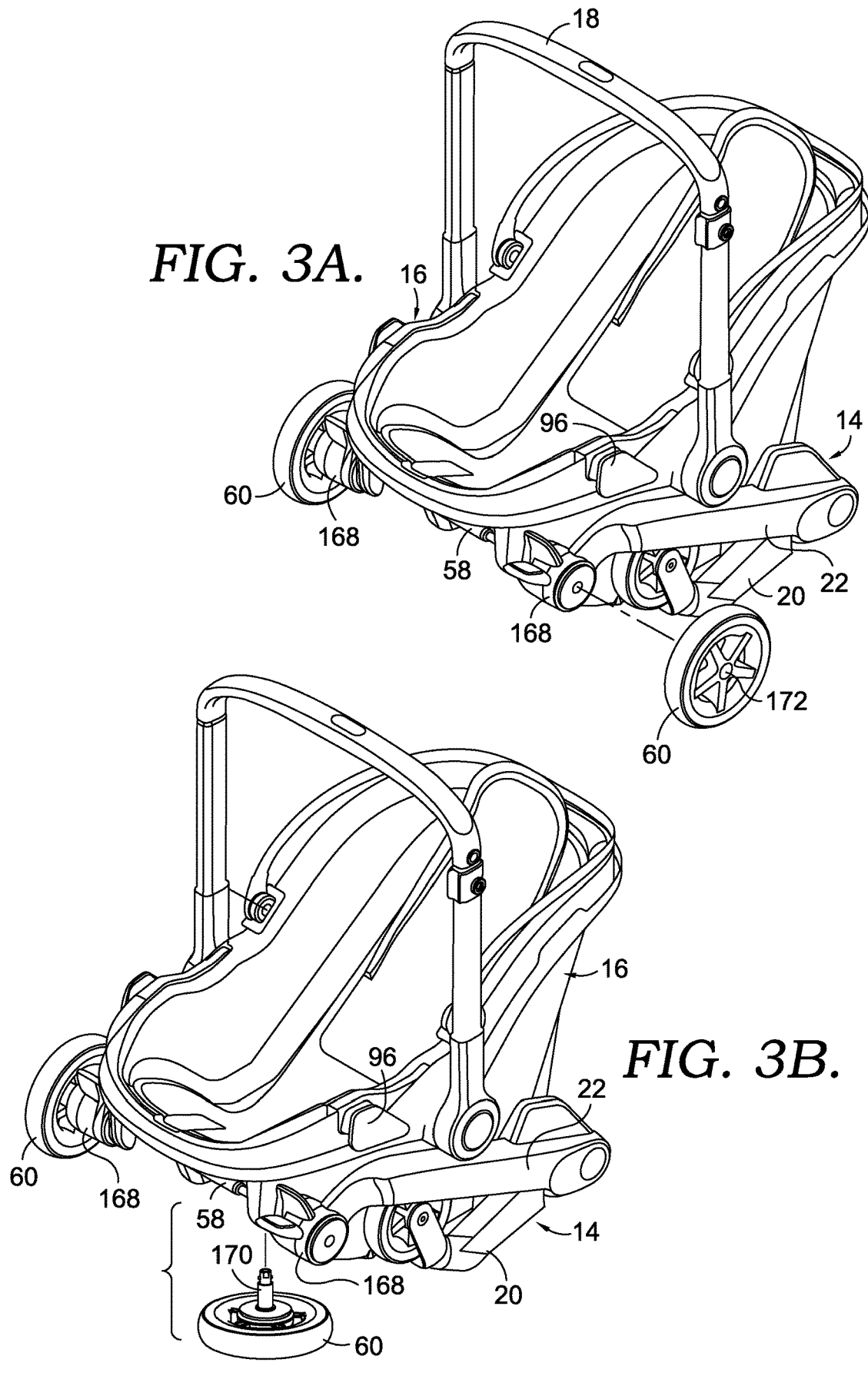
FIG. 3A is a perspective view of the chassis and the shell of the infant transport system, decoupled from the base and showing a first stage of repositioning a rear wheel.
FIG. 3B is a perspective view of the chassis and the shell of the infant transport system, decoupled from the base and showing a second stage of reposition a rear wheel.
Figure 4:
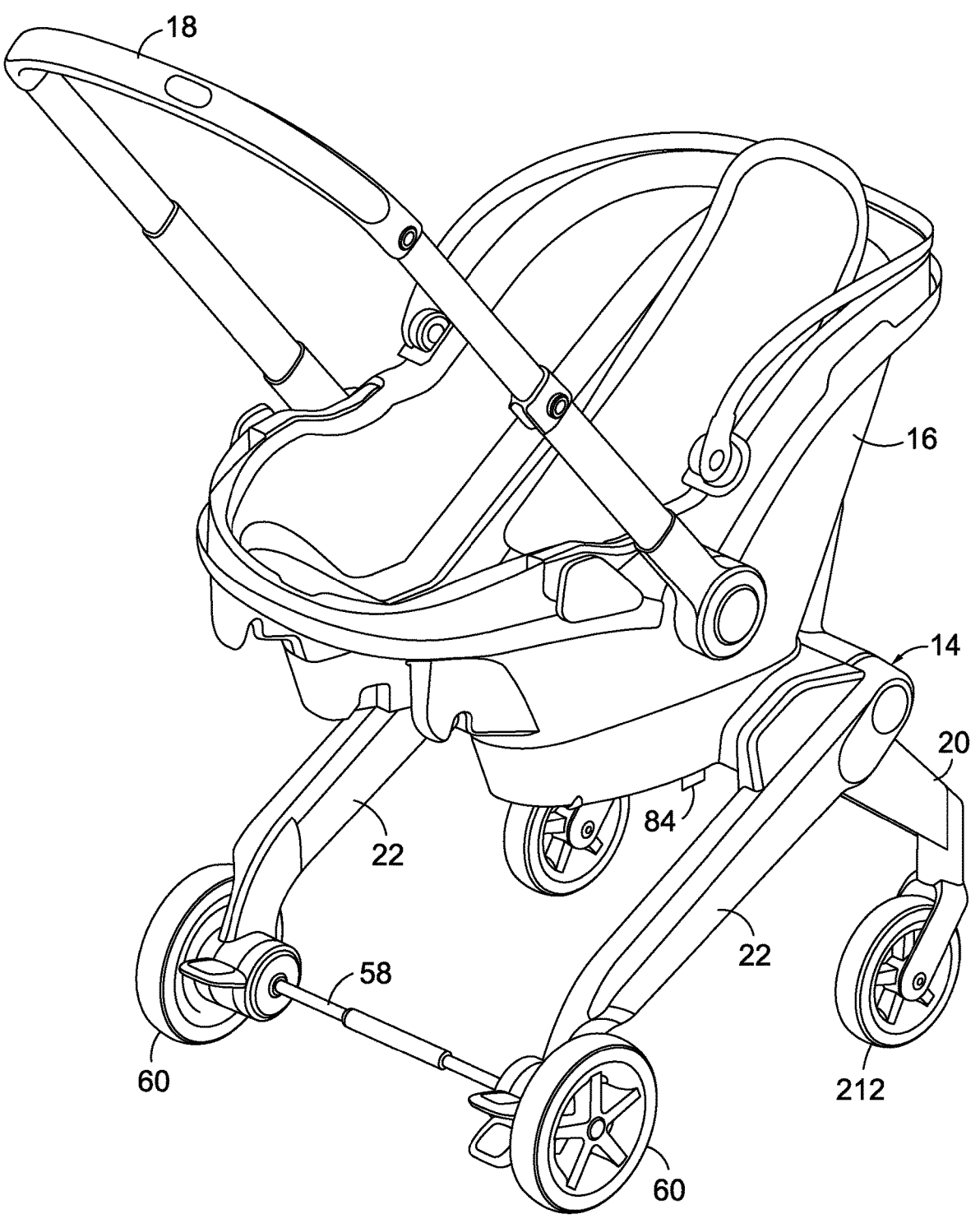
FIG. 4 is a perspective view of the chassis and the shell of the infant transport system decoupled from the base and with the legs deployed in a second transport condition.
Figure 13A:
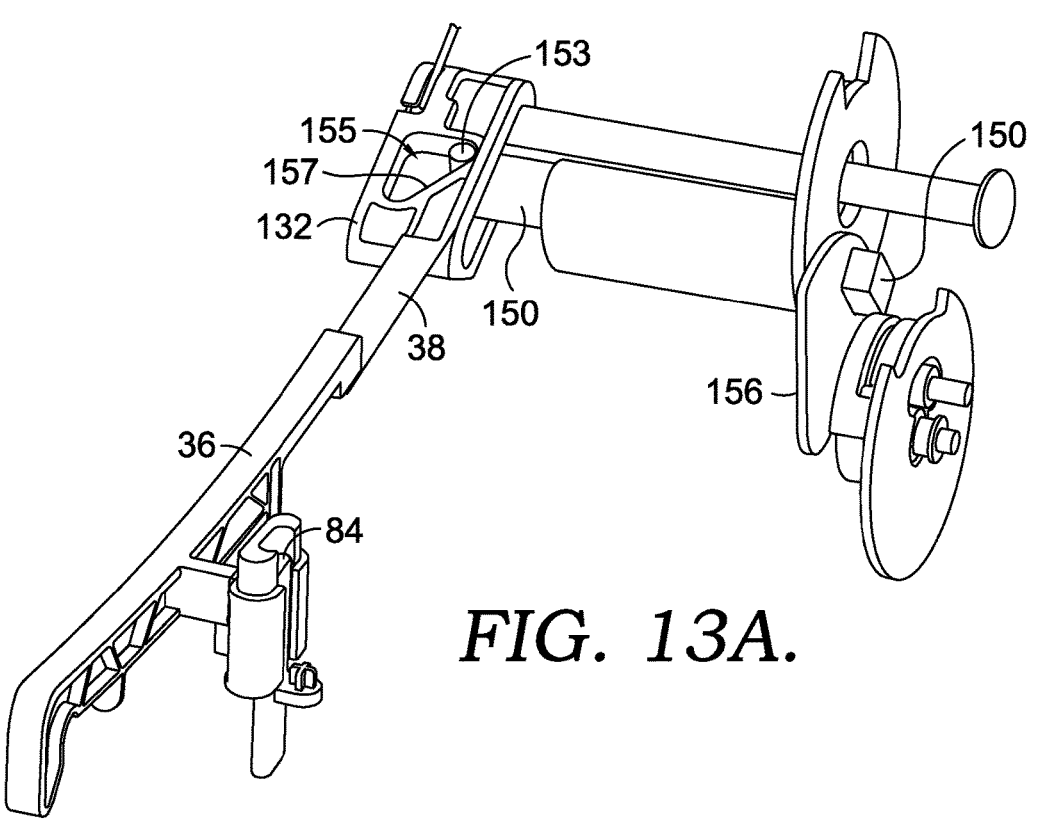
FIG. 13A is a partial perspective view of certain components of a first release mechanism in a first state.
Figure 13B:
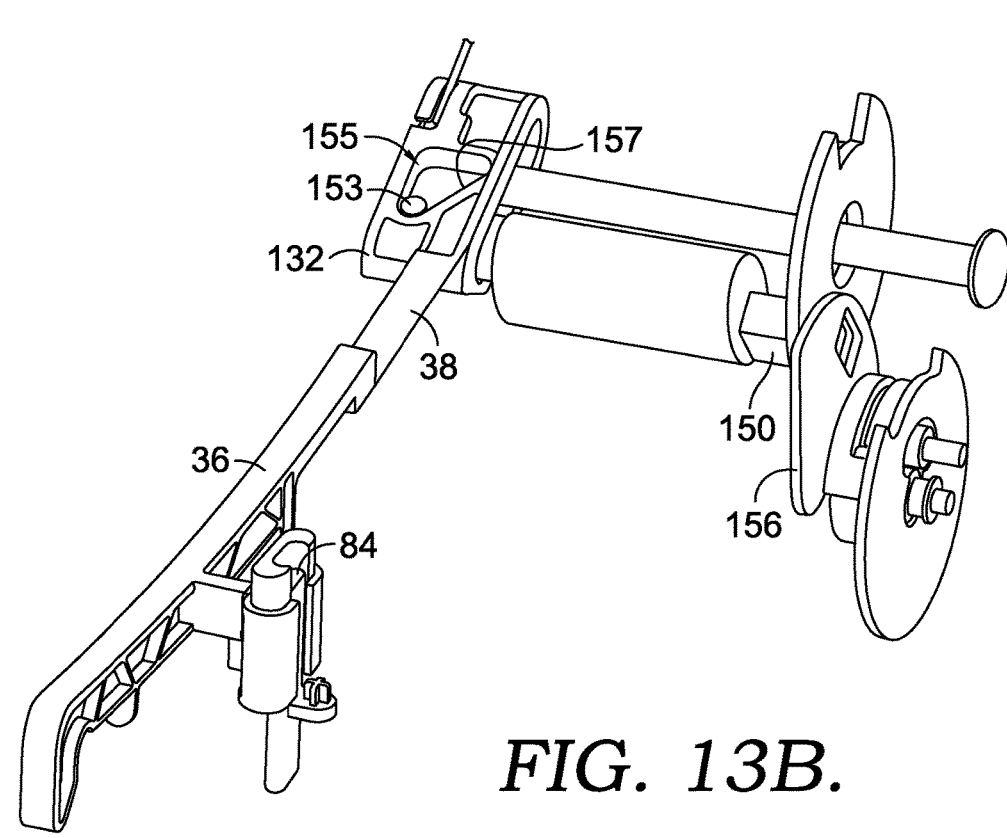
FIG. 13B is a view similar to FIG. 13A with the first release mechanism in a second state.
Figure 14:
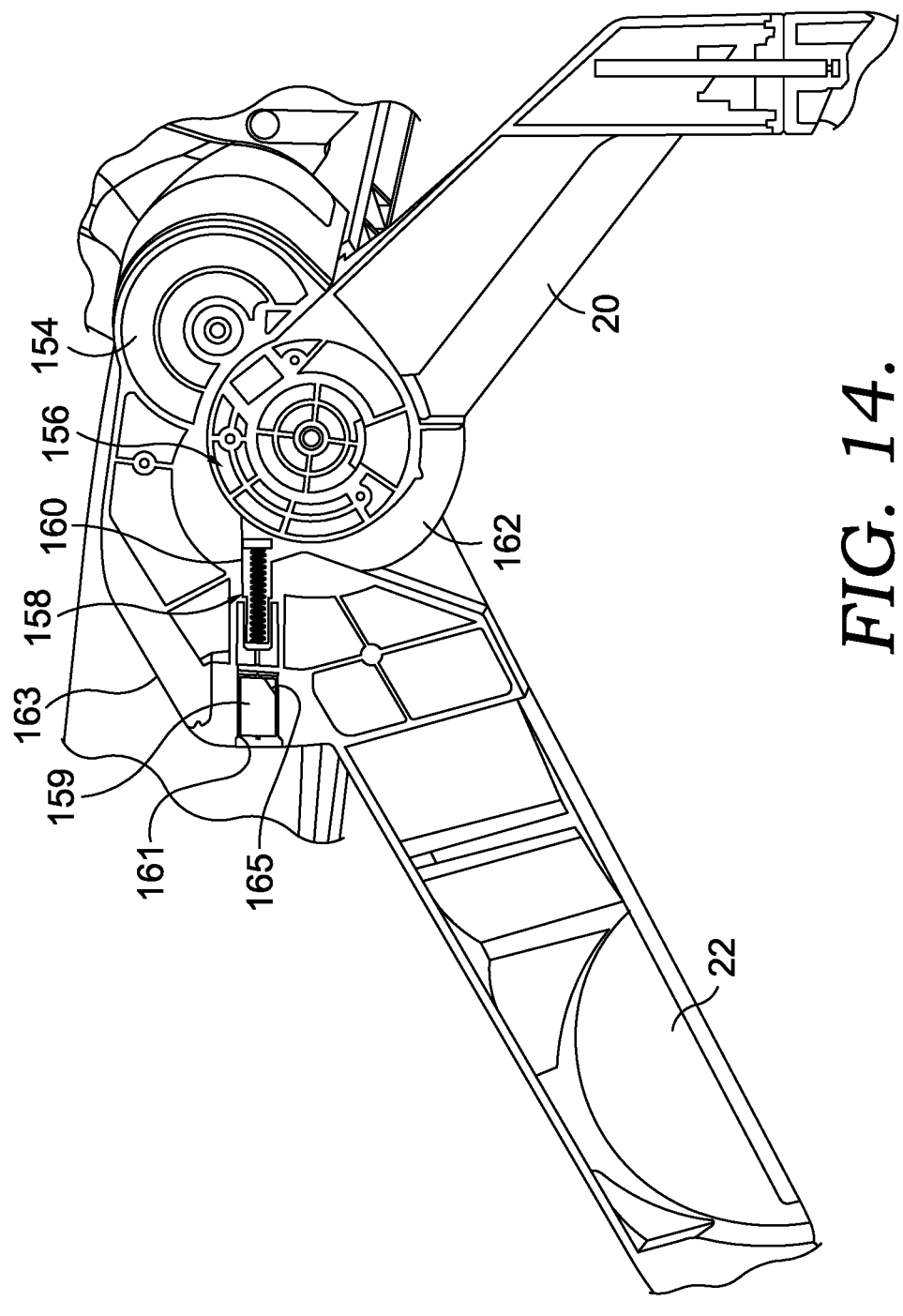
FIG. 14 is a partial cross-section of the legs of the chassis of FIG. 12.
Figure 15:
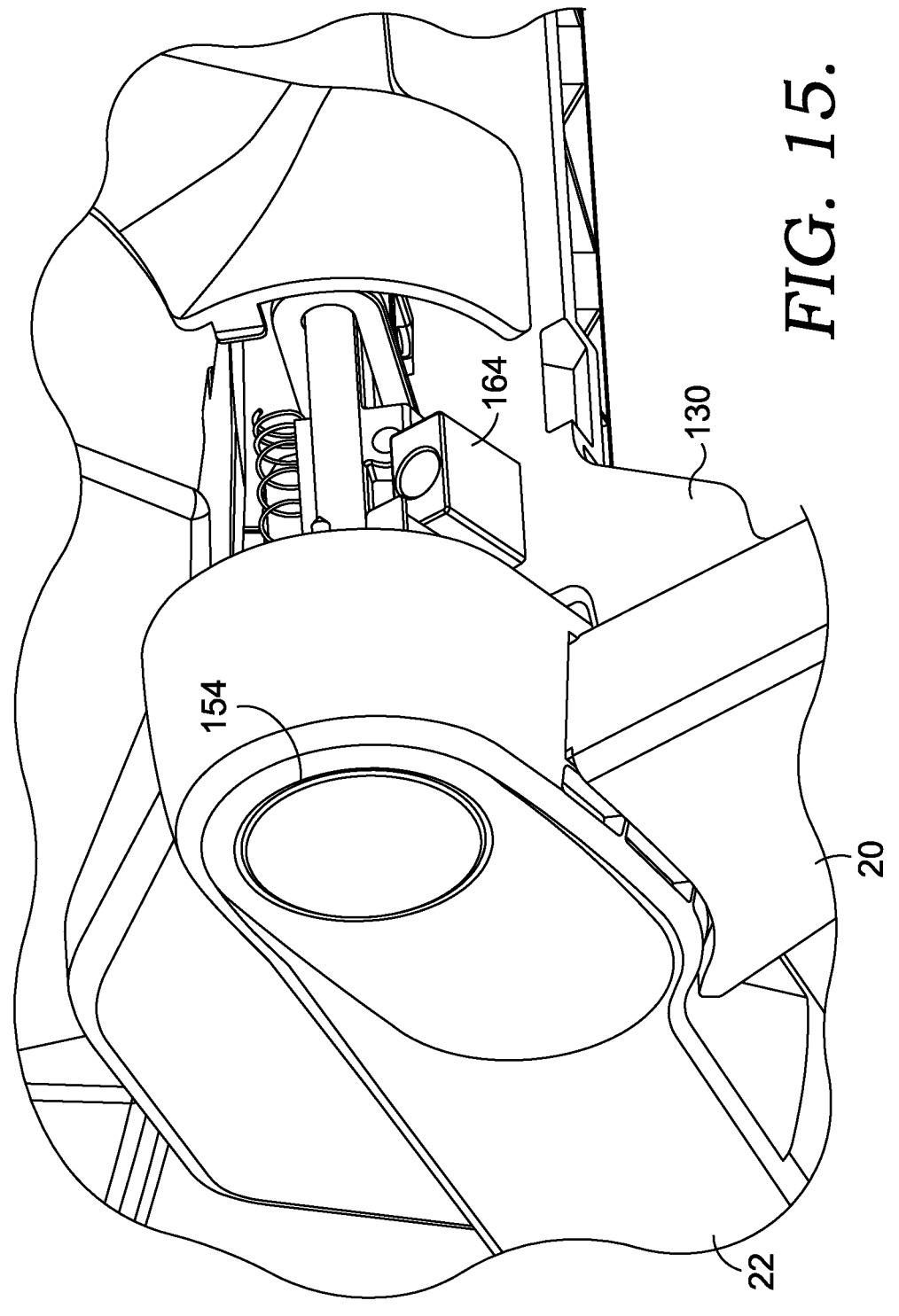
FIG. 15 is a partial perspective view of the chassis with parts being broken away.
Figure 16:
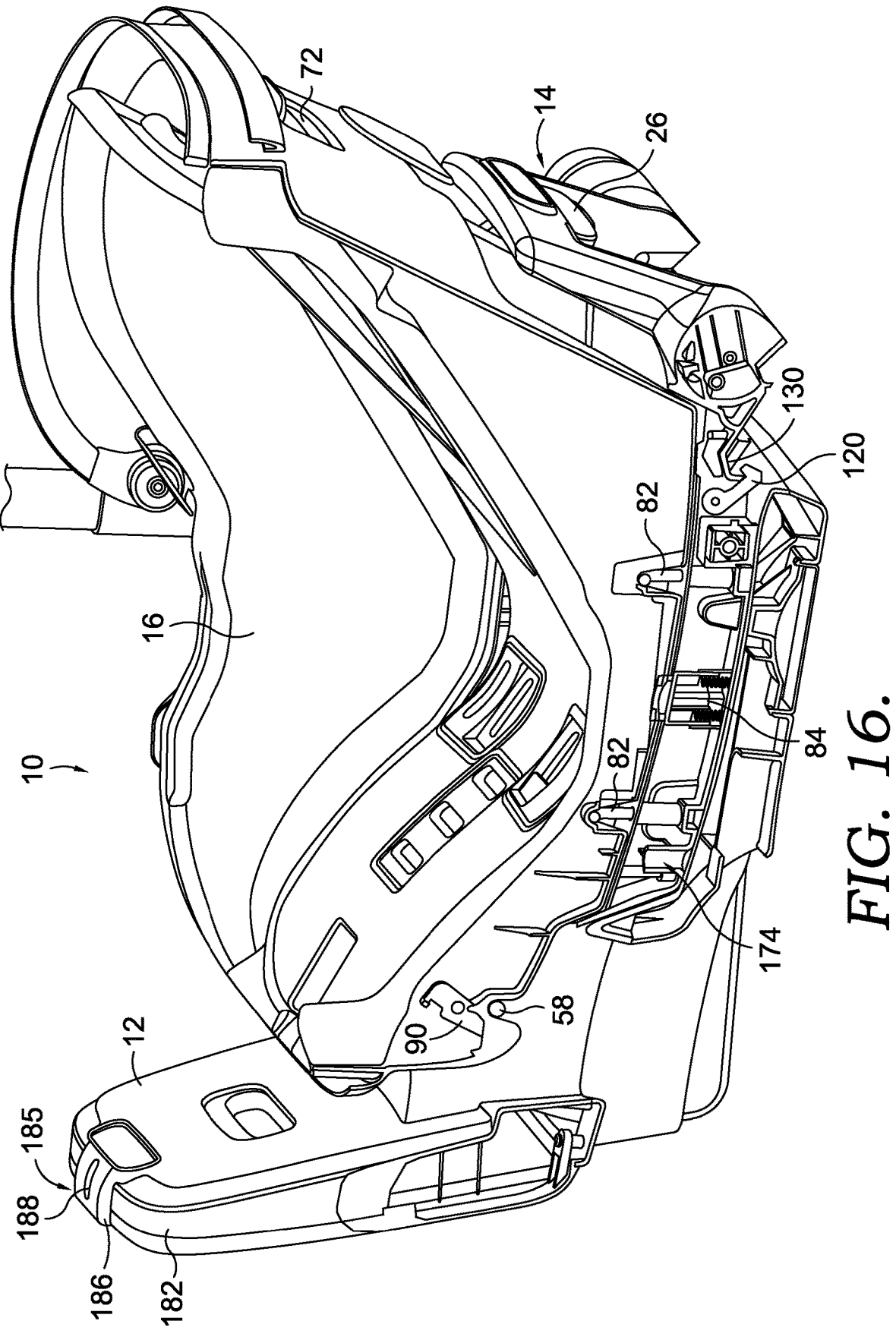
FIG. 16 is a cross-section of the infant transport system of FIG. 1.

The first release mechanism 24 is operable in a second function to allow the deployed front legs 20 and the rear legs 22 (as shown in FIG. 4) to be retracted and returned to the transport condition shown in FIG. 3A. To achieve this function, the chassis 14 includes a locking peg 150, as best seen in FIGS. 13A and 13B. The locking peg 150 is spring loaded to extend outwardly (as viewed in FIG. 13A, the spring biases peg 150 to the right). The chassis 14 includes a channel that extends through a hub 154 of the rear leg 22 and into a hub 156 of the front leg 20. When the rear leg 22 rotates downwardly to the deployed transport condition shown in FIG. 4, the locking peg 150 moves, via the spring force, through the channel extending through and into the hub 156 of the front leg 20 (as shown in FIG. 13A), locking the front legs 20 in the deployed condition. The locking peg 150 includes an upwardly extending cam pin 153 that extends through a triangular opening 155 in carriage 132. The triangular opening 155 includes an angled cam surface 157. As the handle 72 is pulled upwardly, the carriage 132 moves rearwardly. This rearward movement causes the cam surface 157 to act on the pin 153, moving the locking peg 150 inwardly and out of engagement with the hub 156 of the front leg 20 (as shown in FIG. 13B), allowing the front leg 20 to rotate. As best seen in FIG. 14, the rear legs 22 are also locked in the deployed condition via a first lock 159 in the chassis 14. The lock 159 is spring loaded to extend into a locking notch 161 in a hub extension 163 in the rear leg 22, when the rear leg 22 is in the deployed position. The front leg 20 has a cam lobe 162 extending radially outwardly from the front leg hub 156. The cam lobe 162 is shaped to engage a release cam 158 that is slidingly disposed in a channel 160, as the front leg 20 rotates from the deployed position to the retracted position. As the cam lobe 162 engages the release cam 158, the release cam 158 is moved into engagement with the lock 159 to move the lock 159 out of the locking notch 161 in the rear leg 22, allowing the rear leg to rotate about hub 154. In some aspects, the release cam 158 has an angled cam surface that interacts with the lock 159 to achieve the inward movement of the lock 159 as it interacts with the release cam 158. Further, in some aspects, the lock 159 may include a chamfer 165 that ensures the lock 159 will not interfere with the retracting motion of the front legs 20 (because the front legs 20 will first contact the chamfer 165 if the lock 159 is not properly fully retracted). When the chassis 14 and shell 16 are in the deployed stroller transport condition of FIG. 4, the first release mechanism 24 may be operated via the handle 26 to allow the front legs 20 and the rear legs 22 to retract. When the handle 26 is pulled, the locking peg 150 moves out of engagement with the hub 156, allowing the front legs 20 to retract. As the front leg 20 rotates, the cam lobe 162 interacts with the lock 158, moving the lock 158 from engagement with the rear leg 22, allowing the rear leg 22 to retract. In this way, the first release mechanism 24 is operable in a second function to allow the front legs 20 and the rear legs 22 to retract. In some aspects, as best seen in FIG. 15, the chassis 14 includes a spring module 164 that acts on the front leg 20. As the locking peg 150 moves out of engagement with the hub 156, the spring module 164 acts to impart a rotational force on the front leg 20 (through the front cross brace 130), assisting the front leg 20 in moving to a retracted position. In some aspects, the spring module 164 acts to only partially retract the front legs 20.

As described above, with the front legs 20 and the rear legs 22 retracted, the combined unit of the chassis 14 and the shell 16 may be used to transport an infant in a vehicle, without using the base 12. In some aspects, to better orient and stabilize the combined unit of the chassis 14 and the shell 16 within the vehicle, it may be desirable to relocate the rear wheels 60. As best seen in FIGS. 3A and 3B, each rear wheel 60 may be releasably coupled a lower hub 168. In some aspects, the rear wheel 60 has an axle 170 that serves as a quick-release pin. The pin has a retractable ball, activated by a push-button 172 at the outer end of the axle 170. When the button 172 is pressed, the ball retracts within the pin, allowing the axle 170 (and thus the rear wheel 60) to be removed from the hub 168 as shown in FIG. 3A. Other forms of quick-release may also be used in coupling the rear wheel 60 within the hub 168. As best seen in FIG. 3B, the removed rear wheel 60 and axle 170 may then be inserted into a vertical receiving cavity 174 (shown in FIG. 16) on the chassis 14. The same can be done for the other rear wheel 60, such that both rear wheels 60 are received in a respective receiving cavity 174 (one on each side of the chassis 14). With the wheels 60 in the receiving cavities 174, the rear wheels 60 prevent the combined unit of the chassis 14 and the shell 16 from rocking or tipping when installed within a vehicle.

Figure 20:
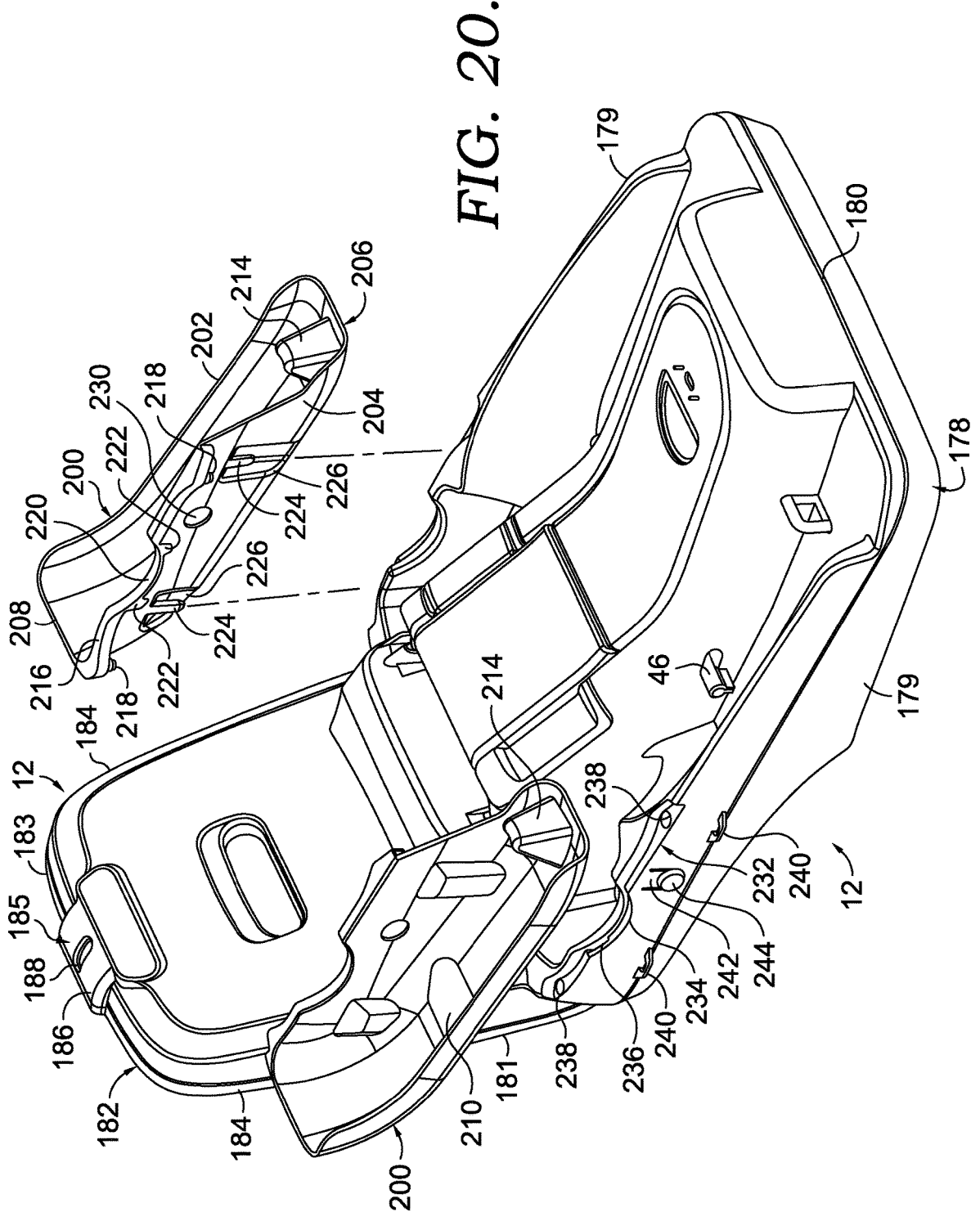
FIG. 20 is perspective view of the base of the infant transport system shown with the wheel guards removed.

Returning to FIG. 20, the base 12 is shown decoupled from the chassis 14 and the shell 16. As described above, the base 12 may be secured within a vehicle and will accept the combined unit of the chassis 14 and the shell 16 for convenient transport of an infant. The base 12, in some aspects, includes a frame 178 having opposed sides 179, a forward end 180 and a rearward end 181. The frame 178 supports an anti-rebound panel 182 that extends upwardly along the rearward end 181. The frame 178 and the anti-rebound panel 182 may be formed as an integral part of the base 12. The anti-rebound panel 182 reduces movement of the base 12 within the vehicle (especially in situations involving a sudden stop, or an impact incident). As best seen in FIG. 20, the anti-rebound panel 182 extends upwardly and has an outer perimeter defined by top-line edge 183 and side edges 184. In some aspects, a level indicator 185 is coupled to the anti-rebound panel 182 on the top-line edge 183. The level indicator 185 may be coupled at the center of the top-line edge for easy viewing by a user when the base is installed on either side of the vehicle. In some aspects, the level indicator 185 includes an outer shell 186 and a bubble level 188. Further, in some aspects, the level indicator 185 may be curved, and in some aspects, both the outer shell 186 and the bubble level 188 have a curved upper surface. In some aspects, the bubble level 188 is recessed below a top surface of the outer shell 186. The level indicator 185 (and specifically the bubble level 188) may be oriented in the longitudinal direction of the base 12. The level indicator 185 is used to indicate proper installation of the base 12 within the vehicle. By locating the level indicator 185 along the top-line edge 183, a user is able to better view the level indicator 185, as opposed to the indicator being elsewhere on the base 12.

The base 12, in some aspects, also includes a wheel guard 200 on each side of the base 12. As best seen in FIG. 20, the wheel guard 200 may include an outer raised lip 202 spaced from an inner wall 204 by a bottom wall 206. On one end, the wheel guard 200 includes a rear wall 208 that extends from the bottom wall 206 and between the inner wall 204 and the outer lip 202. In some aspects, the rear wall 208 is curved to match the outer diameter of the rear wheel 60. Near the transition between the bottom wall 206 and the forward wall 208, the wheel guard 200 may include a wheel bump 210 that is extends upwardly from the bottom wall 206 and that is positioned to locate and support the rear wheel 60. In some aspects, the wheel guard 200 may also include a wheel support 214 that extends upwardly from the bottom wall 206. The wheel support 214 is positioned to support a front wheel 212 at the terminal end of the front leg 20. The wheel support 214 may be a triangular shape whose apex above the bottom wall 206 supports the front wheel 212 when the chassis 14 is coupled to the base 12 (see FIG. 1). The wheel guard 200 may be removably coupled to the base 12, to allow a user to remove and clean the wheel guard 200 as needed. As best seen in FIG. 20, a top wall 216 extends inwardly from the top of the inner wall 204. In some aspects, a pair of locating pegs 218 extend downwardly from the top wall 216. In some aspects, one locating peg 218 is near a forward end of the top wall 216 and one locating peg 218 is near a rearward end of the top wall 216. The top wall 216 may also have a curved hub support section 220 that is positioned and shaped to support the hub 154 for the rear wheel 60. As best seen in FIG. 20, in some aspects, the hub support section 220 may include a pair of downwardly extending locating tabs 222. The wheel guard 200 may also include, in some aspects, a pair of downwardly extending locating fingers 224. The inner wall 204 may include an inwardly extending relief area 226 corresponding to each of the locating fingers 224. The inner wall 204 may also include, in some aspects, a hole 228 that is shown as a circular hole (but that may be other shapes as well). The wheel guard 200 is coupled to the base 12 via the locating pegs 218, the locating tabs 222, the locating fingers 224 and the hole 228. To facilitate this coupling, the frame 178 of the base 12 includes the side walls 179. Each side wall 179 may have a ledge 232 that corresponds in size and shape to the top wall 216 of the wheel guard 200. The ledge 232 includes, in some aspects, a curved depression 234 that corresponds to the curved hub support 220 on the wheel guard 200. The side wall 230 includes a pair of spaced apart slots 236 (only one of which is shown in FIG. 20) that are sized and spaced to accept the locating tabs 222. Similarly, the ledge 232 may include a pair of holes 238 that are sized and spaced to accept the locating pegs 218. As best seen in FIG. 20, a pair of anchors 240 extend outwardly away from the side wall 230. Each of the anchors 240 includes a slot that is sized and shaped to accept a corresponding finger 224 of the wheel guard 200. Additionally, in some aspects, the side wall 230 includes a tab 242 that is resiliently coupled to the side wall 230. In some aspects, the tab 242 is integrally formed with the side wall 230, and is coupled along a top edge to the side wall 230, while the sides and bottom of the tab 242 are not attached to the side wall 230. The lower section of the tab 242 includes a button 244 that is sized and shaped to correspond to the hole 228, such that the hole 228 is a negative form of the button 244. To couple the wheel guard 200 to the base 12, the locating pegs 218 are aligned with the holes 238, the tabs 222 are aligned with slots 236, and the fingers 224 are aligned with the slots in the anchors 240. The wheel guard 200 can then be moved downwardly to engage: the pegs 218 with the holes 230; the tabs 222 with the slots 236 and the fingers 224 with the slots in the anchors 240. As the wheel guard 200 is moved downwardly, the button 244 moves inwardly until the button 244 is aligned with the hole 228. Once the button 244 is aligned with the hole 228, the button 244 will move outwardly to engage the hole 228 and retain the wheel guard 200 in place on base 12. To remove the wheel guard 200, a user can depress the button 244 to move the button 244 from engagement with the hole 228 and allow the user to move the wheel guard 200 upwardly, disengaging the pegs 218, the tabs 222 and the fingers 224. In this manner, a user can remove the wheel guards 200 as desired, such as might be needed to clean the wheel guard 200. The wheel guards 200 can also be removed from the base 12 to allow for a more compact form for shipping.

The following clauses provide example configurations of an infant transport system and assembly as disclosed herein.

Clause 1. A system to transport infant children, comprising: a base configured to be secured to a portion of an automobile; a chassis releasably coupled to the base; an infant car seat releasably couple-able to the combined unit of the base and the chassis; a first two-function release mechanism in the base and chassis, and operable via a first handle on the chassis; and a second two-function release mechanism in the infant car seat and the chassis, and operable via a second handle on the infant car seat.

Clause 2. The system of clause 1, wherein the first function of the first release mechanism releases the chassis and the infant car seat from the base as a combined unit upon operation of the first handle on the chassis.

Clause 3. The system of any of clauses 1-2, wherein the first function of the second release mechanism releases the infant car seat from the combined unit of the chassis and the base upon operation of the second handle on the infant car seat.

Clause 4. The system of any of clauses 1-3, wherein the chassis further comprises a frame, a pair of rear legs pivotally coupled to the frame and a pair of front legs, each front leg pivotally coupled to a respective rear leg, wherein the rear legs and the front legs are retracted and proximate the frame in a first transport condition, and wherein the second function of the second release mechanism releases the rear legs and the front legs from the first transport condition to deploy the front legs and rear legs away from the frame to a second transport condition upon operation of the second handle in the infant car seat.

Clause 5. The system of any of clauses 1-4, wherein the second function of the first release mechanism releases an interlock between the front legs and the frame upon operation of the first handle on the chassis, allowing retraction of the front legs from the second transport condition to the first transport condition.

Clause 6. The system of any of clauses 1-5, wherein the chassis further comprises a rear wheel at a distal end of each rear leg and a front wheel at the distal end of each front leg, and a bar extending at least partially between the rear wheels, and wherein the second release mechanism comprises a hook pivotally coupled to the infant car seat and positioned to releasably engage the bar, and a cable connecting the hook to the second handle on the infant car seat, wherein operation of the second handle pivots the hook away from the bar to achieve a portion of the first function of the second release mechanism or a portion of the second function of the second release mechanism.

Clause 7. The system of any of clauses 1-6, wherein the chassis further comprises a front leg lock pivotally coupled to the frame, and a brace extending between the front legs, the front leg lock engaging the brace and preventing movement of the front legs when in the first transport condition, and wherein the second release mechanism further comprises a release plunger pivotally coupled to the infant car seat, and connected to the cable, and positioned to pivot the front leg lock away from the brace upon operation of the second handle on the infant car seat to achieve a portion of the second function of the second release mechanism.

Clause 8. An infant transport assembly, comprising: a base; a chassis releasably coupled to the base; an infant car seat releasably couple-able to the combined unit of the base and the chassis; a first means for releasing the chassis and the infant car seat from the base as a combined unit upon; and a second means for releasing the infant car seat from the combined unit of the base and the chassis.

Clause 9. The assembly of clause 8, wherein the first means for releasing is operable via a first handle on the chassis.

Clause 10. The assembly of any of clauses 8-9, wherein the second means for releasing is operable via a second handle on the infant car seat.

Clause 11. The assembly of any of clauses 8-10, wherein the chassis further comprises a frame, a pair of rear legs pivotally coupled to the frame and a pair of front legs, each front leg pivotally coupled to a respective rear leg, wherein the rear legs and the front legs are retracted and proximate the frame in a first transport condition, and wherein the second means for releasing also releases the rear legs and the front legs from the first transport condition to deploy the front legs and rear legs away from the frame to a second transport condition upon operation of the second handle in the infant car seat.

Clause 12. The assembly of any of clauses 8-11, wherein the first means for releasing also releases an interlock between the front legs and the frame upon operation of the first handle on the chassis, allowing retraction of the front legs from the second transport condition to the first transport condition.

Clause 13. The assembly of any of clauses 8-12, wherein the chassis further comprises a rear wheel at a distal end of each rear leg and a front wheel at the distal end of each front leg, and a bar extending at least partially between the rear wheels, and wherein the second means for releasing includes a hook pivotally coupled to the infant car seat and positioned to releasably engage the bar, and a cable connecting the hook to the second handle on the infant car seat, wherein operation of the second handle pivots the hook away from the bar.

Clause 14. The assembly of any of clauses 8-13, wherein the chassis further comprises a front leg lock pivotally coupled to the frame, and a brace extending between the front legs, the front leg lock engaging the brace and preventing movement of the front legs when in the first transport condition, and wherein the second means for releasing further comprises a release plunger pivotally coupled to the infant car seat, and connected to the cable, and positioned to pivot the front leg lock away from the brace upon operation of the second handle on the infant car seat.

Clause 15. A multi-function infant transport system, comprising: a base configured to be secured to a portion of an automobile; a chassis releasably coupled to the base; a shell releasably couple-able to the combined unit of the base and the chassis; a first multi-function release mechanism distributed in the base and chassis, and operable via a first handle on the chassis to change functions of the infant transport system; and a second multi-function release mechanism distributed in the shell and the chassis, and operable via a second handle on the shell to change functions of the infant transport system.

Clause 16. The system of clause 15, wherein a first function of the first release mechanism releases the chassis and the shell from the base as a combined unit upon operation of the first handle on the chassis, such that the chassis and shell are usable as a stroller or an infant carrier.

Clause 17. The system of any of clauses 15-16, wherein the first function of the second release mechanism releases the shell from the combined unit of the chassis and the base upon operation of the second handle on the shell, such that the shell is usable as an infant carrier.

Clause 18. The system of any of clauses 15-17, wherein the chassis further comprises a frame, a pair of rear legs pivotally coupled to the frame and a pair of front legs, each front leg pivotally coupled to a respective rear leg, wherein the rear legs and the front legs are retracted and proximate the frame in a first transport condition, and wherein the second function of the second release mechanism releases the rear legs and the front legs from the first transport condition to deploy the front legs and rear legs away from the frame to a second transport condition upon operation of the second handle in the shell.

Clause 19. The system of any of clauses 15-18, wherein the second function of the first release mechanism releases an interlock between the front legs and the frame upon operation of the first handle on the chassis, allowing retraction of the front legs from the second transport condition to the first transport condition.

Clause 20. The system of any of clauses 15-19, wherein the chassis further comprises a rear wheel at a distal end of each rear leg and a front wheel at the distal end of each front leg, and a bar extending at least partially between the rear wheels, and wherein the second release mechanism comprises a hook pivotally coupled to the shell and positioned to releasably engage the bar, and a cable connecting the hook to the second handle on the shell, wherein operation of the second handle pivots the hook away from the bar to achieve a portion of the first function of the second release mechanism or a portion of the second function of the second release mechanism.

To assist and clarify the description of various embodiments, various terms are defined herein. Unless otherwise indicated, the following definitions apply throughout this specification (including the claims). Additionally, all references referred to are incorporated herein in their entirety.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A system to transport infant children, comprising:
a base, having a post;
a chassis, having a moveable hook, a frame, and a pair of front legs and a pair of rear legs, each front leg pivotally coupled to a respective rear leg, wherein the rear legs and the front legs are retracted in a first transport condition and are deployed away from the frame in a second transport condition, the chassis releasably coupled to the base;
an infant car seat releasably coupleable to a combined unit of the base and the chassis;

13 a first two-function release mechanism in the base and chassis, and operable via a first handle on the chassis, in a first function of the first two-function release mechanism, the chassis and the infant car seat are released from the base as a combined unit as the first handle is activated, moving the hook on the chassis away from the post on the base, and in a second function of the first two-function release mechanism, when the infant car seat and the chassis are separated from the base, the front legs and the rear legs on the chassis are moveable from the second transport condition to the first transport condition as the first handle is activated; and a second two-function release mechanism in the infant car seat and the chassis, and operable via a second handle on the infant car seat.

2. The system of claim 1, wherein the first function of the second release mechanism releases the infant car seat from a combined unit of the chassis and the base upon operation of the second handle on the infant car seat.

3. The system of claim 2, wherein the second function of the first release mechanism releases an interlock between the front legs and the frame upon operation of the first handle on the chassis, allowing retraction of the front legs from the second transport condition to the first transport condition.

4. The system of claim 3, wherein the chassis further comprises a rear wheel at a distal end of each rear leg and a front wheel at the distal end of each front leg, and a bar extending at least partially between the rear wheels, and wherein the second release mechanism comprises a hook pivotally coupled to the infant car seat and positioned to releasably engage the bar, and a cable connecting the hook to the second handle on the infant car seat, wherein operation of the second handle pivots the hook away from the bar to allow the rear legs and the front legs to move from the first transport condition to the second transport condition when the chassis and the infant car seat are disengaged from the base.

5. The system of claim 4, wherein the chassis further comprises a front leg lock pivotally coupled to the frame, and a brace extending between the front legs, the front leg lock engaging the brace and preventing movement of the front legs when in the first transport condition, and wherein the second release mechanism further comprises a release plunger pivotally coupled to the infant car seat, and connected to the cable, and positioned to pivot the front leg lock away from the brace upon operation of the second handle on the infant car seat to achieve a portion of the second function of the second release mechanism.

6. An infant transport assembly, comprising:
a base;
a chassis releasably coupled to the base, wherein the chassis further comprises a frame, a pair of rear legs pivotally coupled to the frame and a pair of front legs;
an infant car seat releasably coupleable to the combined unit of the base and the chassis;
a first means for releasing the chassis and the infant car seat from the base as a combined unit, wherein the first means for releasing is operable via a first handle on the chassis; and
a second means for releasing the infant car seat from the combined unit of the base and the chassis, wherein the second means for releasing is operable via a second handle on the infant car seat;
wherein the rear legs and the front legs are retracted and proximate the frame in a first transport condition, and wherein the second means for releasing also releases the rear legs and the front legs from the first transport condition to deploy the front legs and rear legs away from the frame to a second transport condition upon operation of the second handle in the infant car seat;
wherein the chassis further comprises a rear wheel at a distal end of each rear leg and a front wheel at the distal end of each front leg, and a bar extending at least partially between the rear wheels, and wherein the second means for releasing includes a hook pivotally coupled to the infant car seat and positioned to releasably engage the bar, and a cable connecting the hook to the second handle on the infant car seat, wherein operation of the second handle pivots the hook away from the bar;
wherein the chassis further comprises a front leg lock pivotally coupled to the frame, and a brace extending between the front legs, the front leg lock engaging the brace and preventing movement of the front legs when in the first transport condition, and wherein the second means for releasing further comprises a release plunger pivotally coupled to the infant car seat, and connected to the cable, and positioned to pivot the front leg lock away from the brace upon operation of the second handle on the infant car seat.

7. The assembly of claim 6, wherein the first means for releasing is operable via a first handle on the chassis.

8. The system of claim 7, wherein the first means for releasing also releases an interlock between the front legs and the frame upon operation of the first handle on the chassis, allowing retraction of the front legs from the second transport condition to the first transport condition.

9. A multi-function infant transport system, comprising:
a base, having a post;
a chassis, having a moveable hook, a frame, and a pair of front legs and a pair of rear legs, each front leg pivotally coupled to a respective rear leg, wherein the rear legs and the front legs are retracted in a first transport condition and are deployed away from the frame in a second transport condition, the chassis releasably coupled to the base;
a shell releasably coupleable to a combined unit of the base and the chassis;
a first multi-function release mechanism with portions distributed in the base and chassis, and operable via a first handle on the chassis, wherein in a first function of the first multi-function release mechanism, the chassis and the shell are released from the base as a combined unit as the first handle is activated, moving the hook on the chassis away from the post on the base, and in a second function of the first multi-function release mechanism, when the shell and the chassis are separated from the base, the front legs and the rear legs on the chassis are moveable from the second transport condition to the first transport condition as the first handle is activated; and
a second multi-function release mechanism with portions distributed in the shell and the chassis, and operable via a second handle on the shell.

10. The system of claim 9, wherein the first function of the second multi-function release mechanism releases the shell from a combined unit of the chassis and the base upon operation of the second handle on the shell, such that the shell is usable as an infant carrier.

11. The system of claim 10, wherein the second function of the second release mechanism releases the rear legs and the front legs from the first transport condition to deploy the front legs and rear legs away from the frame to a second transport condition upon operation of the second handle in the shell.

12. The system of claim 11, wherein the second function of the first release mechanism releases an interlock between the front legs and the frame upon operation of the first handle on the chassis, allowing retraction of the front legs from the second transport condition to the first transport condition.

13. The system of claim 12, wherein the chassis further comprises a rear wheel at a distal end of each rear leg and a front wheel at the distal end of each front leg, and a bar extending at least partially between the rear wheels, and wherein the second multi-function release mechanism comprises a hook pivotally coupled to the shell and positioned to releasably engage the bar, and a cable connecting the hook to the second handle on the shell, wherein operation of the second handle pivots the hook away from the bar to allow the rear legs and the front legs to move from the first transport condition to the second transport condition when the chassis and the infant car seat are disengaged from the base.

\* \* \* \* \*